(12) United States Patent
Durel et al.

(10) Patent No.: US 7,250,463 B2
(45) Date of Patent: Jul. 31, 2007

(54) DIENE RUBBER COMPOSITION FOR TIRE COMPRISING A SPECIFIC SILICA AS REINFORCING FILLER

(75) Inventors: Olivier Durel, Clermont-Ferrand (FR); Arnaud Lapra, Clermont-Ferrand (FR); Julien Hernandez, Antony (FR); Rémi Valero, Lyons (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 329 days.

(21) Appl. No.: 10/777,075

(22) Filed: Feb. 13, 2004

(65) Prior Publication Data

US 2005/0004297 A1    Jan. 6, 2005

Related U.S. Application Data

(63) Continuation of application No. PCT/EP02/09069, filed on Aug. 13, 2002.

(30) Foreign Application Priority Data

Aug. 13, 2001  (FR) .................................. 01 10871

(51) Int. Cl.
  *C08K 3/34* (2006.01)
(52) U.S. Cl. ........................ 524/492; 524/493; 152/450
(58) Field of Classification Search ................ 524/492, 524/493; 152/450
  See application file for complete search history.

(56) References Cited

U.S. PATENT DOCUMENTS 6,191,205 B1    2/2001  Micouin et al.

2005/0282951 A1*  12/2005  Esch et al. .................. 524/493

FOREIGN PATENT DOCUMENTS

| EP | 0881252 A1 | 12/1998 |
|---|---|---|
| EP | 1043357 A1 | 10/2000 |
| WO | WO99/28376 | 6/1999 |
| WO | WO01/07364 A1 | 2/2001 |

OTHER PUBLICATIONS

International Search Report issued in Application No. PCT/EP02/09069, Nov. 26, 2002.

* cited by examiner

*Primary Examiner*—Peter D. Mulcahy
(74) *Attorney, Agent, or Firm*—Buchanan Ingersoll & Rooney PC

(57) ABSTRACT

Diene rubber compositions are described containing a diene elastomer, a reinforcing inorganic filler, and a coupling agent wherein the inorganic filler includes a silica having the following characteristics:
  (a) a BET specific surface area between 45 and 400 m²/g;
  (b) a CTAB specific surface area between 40 and 380 m²/g;
  (c) an average particle size (by mass), $d_w$, of 20 to 300 nm;
and at least one of the following characteristics, preferably two and more preferably all three:
  (d) a particle size distribution such that $dw \geq /CTAB)-30$;
  (e) a porosity which meets the criterion $L/FI \geq -0.0025$ CTAB+0.85;
  (f) an amount of silanols per unit of surface area, $N_{SiOH/nm^2}$; $N_{SiOH/nm^2} \leq -0.027$ CTAB+10.5.
These diene rubber compositions can be used for the manufacture of tires or of semi-finished products intended for tires.

12 Claims, 2 Drawing Sheets

Figure 1:
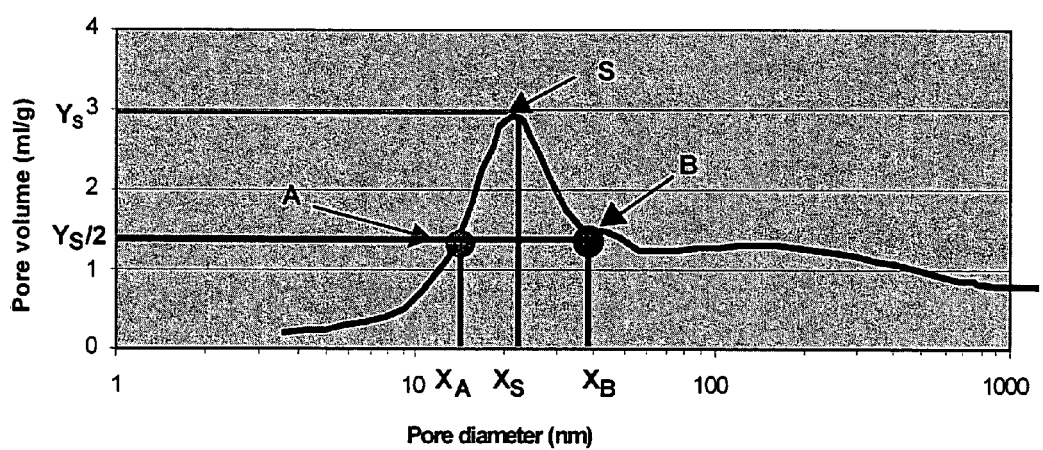

DIENE RUBBER COMPOSITION FOR TIRE COMPRISING A SPECIFIC SILICA AS REINFORCING FILLER

CROSS-REFERENCE TO RELATED APPLICATIONS

This application is a continuation of International Application No. PCT/EP02/09069, filed Aug. 13, 2002, and published in French as Publication No. WO 03/016387, and which claims priority to French Patent Application No. 0110871, filed on Aug. 13, 2001, the entire contents of both applications being incorporated herein in their entirety.

BACKGROUND OF THE INVENTION

The present invention relates to diene rubber compositions reinforced with an inorganic filler, which are intended for the manufacture of tires or of semi-finished products for tires, in particular for the treads of these tires.

In order to obtain the optimum reinforcement properties imparted by a filler in a tire tread and thus high wear resistance, it is known that this filler should generally be present in the elastomeric matrix in a final form which is both as finely divided as possible and distributed as homogeneously as possible. Now, such conditions can only be obtained insofar as this filler has a very good ability firstly to be incorporated into the matrix during mixing with the elastomer and to be disagglomerated, and secondly to be dispersed homogeneously in this matrix.

It is known that carbon black has such abilities, which is generally not true of inorganic fillers, in particular silicas, because, for reasons of mutual attraction, these inorganic filler particles have an irritating tendency to agglomerate together within the elastomeric matrix. The harmful consequence of these interactions is to limit the dispersion of the filler and hence the reinforcing properties to a substantially lower level than that which it would be theoretically possible to achieve if all the (inorganic filler/elastomer) bonds that could be created during the mixing operation were in fact obtained; these interactions furthermore tend to increase the consistency of the rubber compositions in the uncured state and therefore to make them more difficult to work ("processability") than in the presence of carbon black.

Since fuel economies and the need to protect the environment have become priorities, it has proved necessary to produce tires having reduced rolling resistance, without adversely affecting their wear resistance.

This has been made possible in particular due to the use, in treads for these tires, of new rubber compositions reinforced with inorganic fillers, in particular specific silicas of the highly dispersible type, which are capable of rivaling a conventional tire-grade carbon black from the reinforcing point of view, while offering these compositions a lower hysteresis, which is synonymous with lower rolling resistance for the tires comprising them, and also improved grip on wet, snow-covered or icy ground.

Treads filled with such highly dispersible silicas (referred to as "HD" or "HDS" for "highly dispersible" or "highly dispersible silica"), usable in tires having low rolling resistance which are sometimes referred to as "Green Tires" because of the energy saving offered to the user ("Green Tire concept"), have been described in large numbers. Reference will be made in particular to patent applications EP 501 227, EP 692 492, EP 692 493, EP 735 088, EP 767 206, EP 786 493, EP 881 252, WO99/02590, WO99/02601, WO99/02602, WO99/06480, WO00/05300 and WO00/05301.

These documents of the prior art teach the use of silicas of HD type having a BET specific surface area of between 100 and 250 $m^2/g$. In practice, one HD silica of high specific surface area forming a reference in the field of "Green Tires" is in particular the silica "Zeosil 1165 MP" (BET surface area equal to approximately 160 $m^2/g$) sold by Rhodia. Use of this silica "Zeosil 1165 MP" makes it possible to obtain good compromises in terms of tire performance, in particular satisfactory wear resistance and rolling resistance.

The advantage of using a silica having a high specific surface area lies mainly in the possibility of increasing the number of bonds of the silica with the elastomer and therefore of increasing the level of reinforcement thereof. This is why it appears advantageous to use in rubber compositions for tire treads silicas having a high specific surface area, possibly greater than that conventionally used of the order of 160 $m^2/g$, in order in particular to improve the wear resistance of these treads. Nevertheless, the dispersibility of the filler and the increase in its specific surface area are considered to be contradictory characteristics, because a large specific surface area assumes an increase in the interactions between objects of filler, and therefore poor dispersion thereof in the elastomeric matrix and difficult processing.

SUMMARY OF THE INVENTION

The Applicants have demonstrated that a new family of highly dispersible silicas can advantageously be used as reinforcing filler in rubber compositions for tires. These silicas have a particular grain size distribution, surface reactivity and/or porosity. Unexpectedly, the Applicants have demonstrated that the silicas of high specific surface area of this new family offer an exceptionally high dispersion capacity within the elastomeric matrix, given their specific surface area. They are less difficult to process and furthermore induce a reduction in the hysteresis of the rubber compositions containing them.

The silicas of this new family are obtainable by precipitation in accordance with an original preparation process.

The Applicants have also demonstrated that this novel silica preparation process makes it possible to obtain highly dispersible silicas, which are particularly advantageous for use as reinforcing filler in rubber compositions for tires.

Ideally, a tire tread must meet a large number of technical demands including high wear resistance and low rolling resistance, a high level of grip on all types of ground, while offering the tire a good level of road behavior on an automobile. Thus, in the field of tires, it is desired to find rubber compositions which impart the best possible compromise of tire performances.

Now, the Applicants have surprisingly and unexpectedly discovered during their research that the use of these new silicas as reinforcing fillers for the manufacture of tire treads, and more particularly those having a large specific surface area, makes it possible to achieve an excellent and surprising compromise of performances of the tire. This compromise is better than the one offered by the existing silicas of high specific surface area conventionally used in the treads of "Green Tires" and offers a level of reinforcement which has never been achieved hitherto on such treads. This compromise is expressed more particularly by a very significant improvement in the wear resistance accompanied by an unexpected reduction in the rolling resistance, without for all that adversely affecting the other technical requirements.

BRIEF DESCRIPTION OF DRAWING FIGURES

Figure 2:
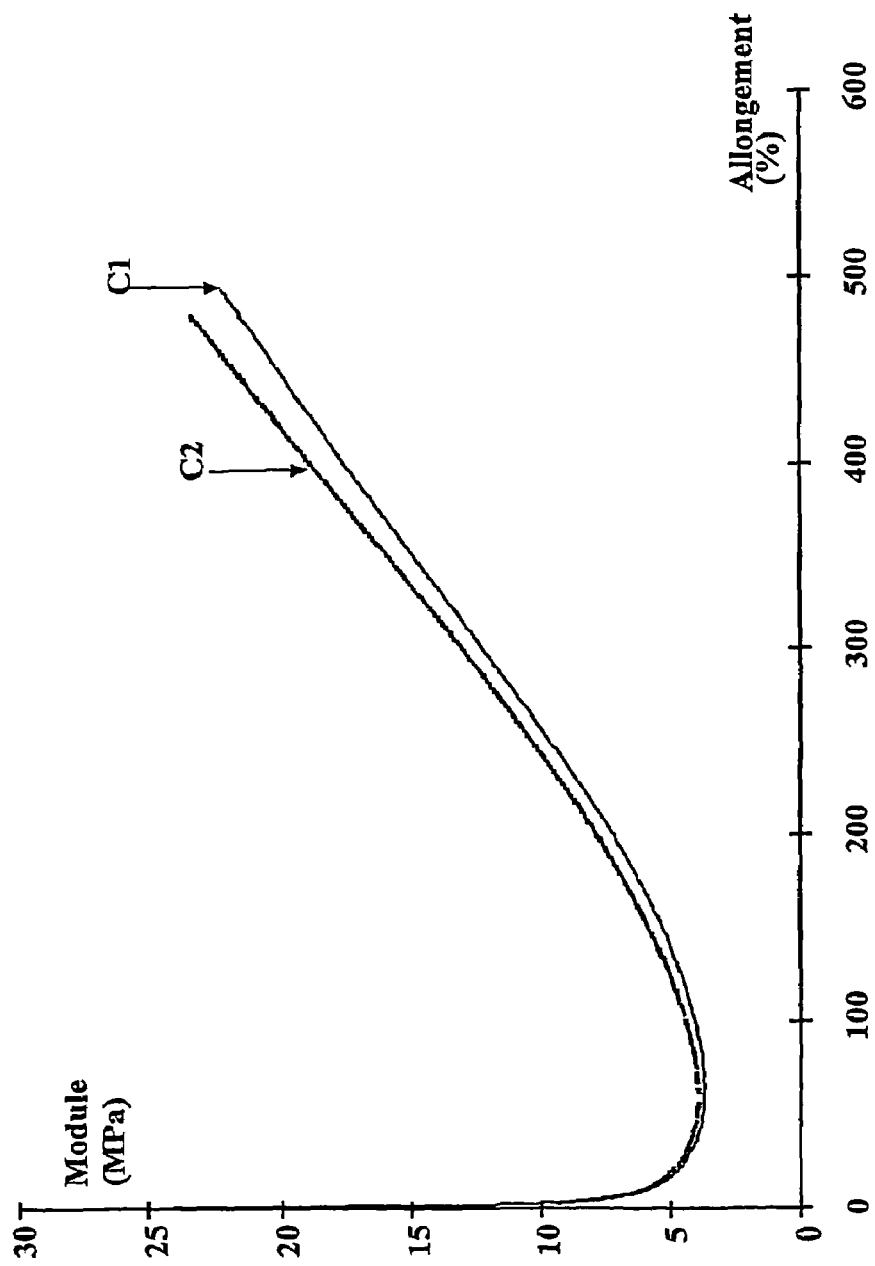

FIG. 1 represents a curve of the volume of pores as a function of the diameter of the pores; and FIG. 2 represents curves of variation in modulus as a function of the elongation for two diene rubber compositions.

DETAILED DESCRIPTION

Generally "high specific surface area" is understood to mean BET surface areas of at least approximately 130 m$^2$/g, or even greater than 150 m$^2$/g.

Consequently, a first subject of the invention relates to a diene rubber composition for tires (that is to say one intended for the manufacture of tires or of semi-finished products of rubber intended for the manufacture of these tires) based on at least (i) a diene elastomer, (ii) a reinforcing inorganic filler, (iii) a coupling agent providing the bond between the reinforcing filler and the elastomer, characterized in that said inorganic filler comprises at least one silica obtainable by a particular process.

This process comprises the reaction of a silicate with an acidifying agent, by means of which a suspension of silica is obtained, then the separation and the drying of this suspension, characterized in that the reaction of the silicate with the acidifying agent is carried out in accordance with the following successive steps:

(α) an aqueous stock having a pH of between 2 and 5 is formed, (β) silicate and acidifying agent is added to said stock, simultaneously, such that the pH of the reaction medium is kept between 2 and 5, (γ) the addition of the acidifying agent is stopped while the addition of silicate to the reaction medium is continued until a value of the pH of the reaction medium of between 7 and 10 is obtained, (δ) silicate and acidifying agent are added to the reaction medium, simultaneously, such that the pH of the reaction medium is kept between 7 and 10, (ε) the addition of the silicate is stopped while the addition of the acidifying agent to the reaction medium is continued until a value of the pH of the reaction medium of less than 6 is obtained.

It was thus discovered that the succession of specific steps, and in particular the presence of a first simultaneous addition of acidifying agent and of silicate in acidic medium at a pH between 2 and 5 and of a second simultaneous addition of acidifying agent and of silicate in basic medium at a pH of between 7 and 10, constituted important conditions for imparting their specific characteristics and properties to the products obtained.

Advantageously the silicas thus obtained have a BET specific surface area of between 45 and 400 and preferably between 80 and 300 m$^2$/g, a CTAB specific surface area of between 40 and 380 and preferably between 70 and 280 m$^2$/g and an average particle size (by mass), $d_w$, of 20 to 300 nm.

The subject of the invention is also a diene rubber composition for tires (that is to say which is intended for the manufacture of tires or of semi-finished products made of rubber intended for the production of these tires) based on at least (i) a diene elastomer, (ii) a reinforcing inorganic filler, (iii) a coupling agent providing the bond between the reinforcing filler and the elastomer, characterized in that said inorganic filler comprises at least one silica having the following characteristics:

(a) a BET specific surface area of between 45 and 400, and preferably between 80 and 300 m$^2$/g;

(b) a CTAB specific surface area of between 40 and 380, and preferably between 70 and 280 m$^2$/g;

(c) an average particle size (by mass), $d_w$, of 20 to 300 nm; and at least one of the following characteristics, preferably two and even more preferably all three:

(d) a particle size distribution such that $dw \geq (16,500/CTAB) - 30$;

(e) a porosity which meets the criterion $L/FI \geq -0.0025\ CTAB + 0.85$;

(f) an amount of silanols per unit of surface area, $N_{SiOH/nm^2}$, $N_{SiOH/nm^2} \leq -0.027\ CTAB + 10.5$.

These highly dispersible silicas are obtainable by precipitation in accordance with the original preparation process for silicas described further above.

Another subject of the invention is the use of a diene rubber composition according to the invention for the manufacture of tires or of semi-finished products made of rubber intended for these tires, these semi-finished products being selected in particular from among the group comprising treads, underlayers intended for example to be positioned beneath these treads, crown plies, sidewalls, carcass plies, beads, protectors, inner tubes and airtight internal rubbers for tubeless tires.

The composition for tires according to the invention is particularly suited to the manufacture of tire treads intended to be fitted on passenger vehicles, vans, 4×4 vehicles (having 4 driving wheels), two-wheeled vehicles, "heavy vehicles" (that is to say subway trains, buses, road transport machinery (lorries, tractors, trailers), off-road vehicles), aircraft, construction, agricultural or handling machinery, these treads being able to be used in the manufacture of new tires or for recapping worn tires.

One subject of the invention is also these tires and these semi-finished products made of rubber intended for tires when they comprise a rubber composition according to the invention, in particular tire treads, these treads having surprisingly both reduced rolling resistance and significantly increased wear resistance.

The diene rubber composition for tires according to the invention is obtainable by a process which constitutes another subject of the present invention. This process comprises the following steps:

i. there is incorporated in a diene elastomer, during a first stage referred to as "non-productive":
an inorganic filler as reinforcing filler;
and a coupling agent providing the bond between the inorganic filler and the diene elastomer;

ii. the entire mixture is kneaded thermomechanically, in one or more stages, until a maximum temperature of between 110° C. and 190° C. is reached;

iii. the whole is cooled to a temperature of less than 100° C.;

iv. there is then incorporated, during a second step referred to as "productive", a cross-linking or vulcanization system;

v. the entire mixture is kneaded until a maximum temperature less than 110° C. is reached, said process being characterized in that the inorganic filler is constituted in its entirety or in part of a silica obtained in accordance with the process described further above and/or having the characteristics such as defined further above.

The silica obtained in accordance with the process described further above or having the characteristics such as defined further above, is therefore advantageously used as reinforcing filler in a diene rubber composition for tires (that is to say one intended for the manufacture of tires or of semi-finished products made of rubber intended for the production of these tires).

This is why one subject of the invention is also a process for reinforcing a diene rubber composition intended for the manufacture of tires, characterized in that there is incorporated in this composition in the uncured state, by thermomechanical kneading, a reinforcing silica obtained in accordance with the process described further above and/or having the characteristics such as defined further above.

The invention and its advantages will be readily understood in the light of the description and the examples of embodiment which follow, and the figures, FIG. 1 representing the curve of the volume of the pores as a function of the diameter of the pores, for calculating the pore distribution width pdw, and FIG. 2 representing curves of variation in modulus as a function of the elongation for two distinct diene rubber compositions, one in accordance and the other not in accordance with the invention.

Although the invention is more particularly described in relation to a tire application, the composition according to the invention may be used more generally for the manufacture of finished articles or of semi-finished products, and also these finished articles and semi-finished products themselves, comprising a rubber composition according to the invention, these articles or products being intended for any ground contact system for automobiles, such as tires, internal safety supports for tires, wheels, rubber springs, elastomeric joints, and other suspension and anti-vibration elements.

I. MEASUREMENTS AND TESTS USED

I.1. Characterization of the Silicas

The silicas described hereafter consist in known manner of agglomerates of particles, which are capable of disagglomerating into these particles under the effect of an external force, for example under the action of mechanical working or ultrasound. The term "particle" used in the present application must be understood in its usual generic sense of "aggregate" (also referred to as "secondary particle"), and not in that of a possible elementary particle (also referred to as "primary particle") which may form, if applicable, part of this aggregate; "aggregate" is to be understood, in known manner, to mean the non-splittable unit (i.e. which cannot be cut or divided) generally formed of elementary (primary) particles which are aggregated together, produced during synthesis of the filler.

These silicas are characterized as indicated hereafter.

I.1.1. Specific Surface Area:

The BET specific surface area is determined by adsorption of gas using the method of Brunauer-Emmett-Teller described in "The Journal of the American Chemical Society" Vol. 60, page 309, February 1938, more precisely in accordance with French Standard NF ISO 9277 of December 1996 [multipoint volumetric method (5 points)—gas: nitrogen—degassing: 1 hour at 160° C.—range of relative pressure p/po: 0.05 to 0.17]

The CTAB specific surface area is the external surface area determined in accordance with French Standard NF T 45-007 of November 1987 (method B).

I.1.2. Granulometry:

I.1.2.1. Average Particle Size $d_w$:

The average size (by mass) of the particles, $d_w$, is measured conventionally after dispersion, by ultrasound disagglomeration, of the filler to be analyzed in water.

Measurement takes place using a centrifugal X-ray detection sedimentometer type "XDC" ("X-rays Disk Centrifuge"), sold by Brookhaven Instruments, in accordance with the following method of operation.

A suspension of 3.2 g of a sample of silica to be analyzed in 40 ml of water is produced by action over 8 minutes at 60% power (60% of the maximum position of the "output control") of a 1500-watt ultrasonic probe (Vibracell ¾ inch ultrasound generator sold by Bioblock); after ultrasound generation, 15 ml of the suspension is introduced into the rotating disc; after sedimentation for 120 minutes, the mass distribution of the particle sizes is calculated by the software of the "XDC" sedimentometer. The weight geometric mean of the particle sizes ("geometric mean (Xg)" is what the software refers to), dw, is calculated by the software from the following equation:

$$\log d_w = \frac{\sum_{i=1}^{n} m_i \log d_i}{\sum_{i=1}^{n} m_i},$$

with $m_i$=mass of all the objects in the class of diameter $d_i$.

I.1.2.2. XDC Mode:

It is possible to measure, using this XDC granulometric analysis method by centrifugal sedimentation, the value of the mode of the particles, referred to as XDC mode (the derivative of the cumulative particle size curve gives a frequency curve the abscissa of the maximum of which (abscissa of the main population) is called the Mode).

The method differs from the one previously described for the determination of dw by the fact that the suspension formed (silica+demineralized water) is disagglomerated, on one hand, for 16 minutes, and, on the other hand, using a 1500-watt BRANSON ultrasonic probe, without end piece, of a diameter of 13 mm (used at 60% of maximum power).

I.1.2.3. Distribution Width:

The distribution width is measured in accordance with the XDC granulometric analysis method by centrifugal sedimentation used for measuring the value of the Mode. Then the values of the diameters passing through at 16%, 50% (or median) and 84% (these are mass %) are noted.

The size distribution width Ld of objects, measured by XDC granulometry, after ultrasound disagglomeration (in water) with an ultrasound generation time of 16 min, corresponds to the ratio (d84-d16)/d50, in which dn is the size for which n % of particles (by mass) have a size less than this size (the distribution width Ld is therefore calculated on the cumulative particle size curve, taken in its entirety).

The size distribution width L'd of objects less than 500 nm, measured by XDC granulometry, after ultrasound disagglomeration (in water) with an ultrasound generation time of 16 min, corresponds to the ratio (d84-d16)/d50 in which dn is the size for which there are n % particles (by mass), relative to the particles of a size less than 500 nm, of a size less than this size (the distribution width L'd is therefore calculated on the cumulative frequency distribution, cut off above 500 nm).

I.1.3. Porosimetry:

I.1.3.1. The Pore Size Distribution Width

The parameter L/FI characterizing the pore size distribution width is determined by mercury porosimetry. The measurement is effected by means of the PASCAL 140 and PASCAL 440 porosimeters sold by ThermoFinnigan, operating as follows: a quantity of sample of between 50 and 500 mg (in the present case 140 mg) is introduced into a measuring cell. This measuring cell is installed on the measurement station of the PASCAL 140 apparatus. The sample is then degassed in a vacuum, for the time necessary to reach a pressure of 0.01 kPa (typically of the order of 10 minutes). The measuring cell is then filled with mercury. The first part (pressures less than 400 kPa) of the intrusion curve of the mercury Vp=f(P), where Vp is the intrusion volume of the mercury and P the pressure applied, is determined on the PASCAL 140 porosimeter. The measuring cell is then installed on the measurement station of the PASCAL 440 porosimeter, the second part of the intrusion curve of the mercury Vp=f(P) (pressures of between 100 kPa and 400 MPa) being determined on the PASCAL 440 porosimeter. The porosimeters are used in "PASCAL" mode, so as to permanently adjust the intrusion rate of the mercury as a function of the variations in the intrusion volume. The speed parameter in "PASCAL" mode is set to 5. The pore radii Rp are calculated from the pressure values P using the Washburn equation, a reminder of which is given hereafter, with a hypothesis of cylindrical pores, selecting an angle of contact θ equal to 140° and a surface tension γ equal to 480 dynes/cm.

Washburn equation:

$$R_p = \frac{-2\gamma \cos\theta}{P}$$

The pore volumes Vp are relative to the mass of silica introduced and are expressed in cm³/g. The signal Vp=f(Rp) is smoothed by combining a logarithmic filter (filter parameter "smooth dumping factor" F=0.96) and a moving average filter (filter parameter "number of points to average" f=20). The pore size distribution is obtained by calculating the derivative dVp/dRp of the smoothed intrusion curve.

By definition, the fineness index FI is the value of pore radius (expressed in angströms) corresponding to the maximum of the pore size distribution dVp/dRp. L denotes the width at mid-height of the pore size distribution dVp/dRp. The pore size distribution width of the sample is then characterized using the parameter L/FI.

I.1.3.2. Pore Volumes:

The pore volumes given are measured by mercury porosimetry. They are expressed in cm³/g. The preparation of each sample is as follows: each sample is dried beforehand for 2 hours in an oven at 200° C., then placed in a test receptacle within 5 minutes of emerging from the oven and degassed in a vacuum, for example using a rotary piston pump; the pore diameters (porosimeter MICROMERITICS Autopore III 9420) are calculated by the Washburn equation at an angle of contact θ equal to 140° and a surface tension γ equal to 484 dynes/cm.

$V_{(d5-d50)}$ represents the pore volume constituted by the pores of diameters of between d5 and d50, and $V_{(d5-d100)}$ represents the pore volume constituted by the pores of diameters of between d5 and d100, dn here being the pore diameter for which n % of the total surface of all the pores is provided by the pores of a diameter greater than this diameter (the total surface of the pores ($S_0$) may be determined from the mercury intrusion curve).

I.1.3.3 Pore Distribution Width

The pore distribution width pdw is obtained from the pore distribution curve, as indicated in FIG. 1, the volume of pores (ml/g) as a function of the pore diameter (nm): the coordinates of the point S corresponding to the main population are noted, namely the values of the diameter (nm) $X_S$ and of the pore volume (ml/g) $Y_S$.; a straight line of equation $Y=Y_S/2$ is traced.; this straight line intersects the pore distribution curve at two points A and B having as abscissa (nm) respectively $X_A$ and $X_B$ on either side of $X_S$; the pore distribution width pdw is equal to the ratio $(X_A-X_B)/X_S$.

I.1.4 Surface Chemistry:

I.1.4.1 Number of Silanols per nm²

The number of silanols per nm² is determined by grafting methanol on to the surface of the silica. In a first phase, a quantity of approximately 1 g of crude silica is suspended in 10 ml of methanol, in a 110 ml autoclave (Top Industry, Ref: 09990009).

A bar magnet is introduced and the reactor, which is hermetically sealed and heat-insulated, is heated to 200° C. (40 bar) on a heated magnetic stirrer for 4 hours. The autoclave is then cooled in a bath of cold water. The grafted silica is recovered by decanting and the residual methanol is evaporated under a stream of nitrogen. Finally, the grafted silica is dried at 130° C. in a vacuum for 12 hours. The carbon content is determined by elemental analyzer (analyzer NCS 2500 from CE Instruments) on the crude silica and on the grafted silica. This analysis of carbon on the grafted silica must take place within 3 days from the end of the drying, because the humidity of the air or the heat could cause hydrolysis of the methanol grafting. The number of silanols per nm² is calculated using the following formula:

$$N_{SiOH/nm^2} = \frac{(\%C_g - \%C_c) \times 6.023 \times 10^{23}}{S_{spe} \times 10^{18} \times 12 \times 100}$$

$N_{SiOH/nm}{}^2$: number of silanols per nm² (SiOH/nm²)

% Cg: mass percentage of carbon present on the grafted silica

% Cc: mass percentage of carbon present on the crude silica $S_{spe}$: BET specific surface area of the silica (m²/g)

I.1.4.2 Sears Number

The Sears number is determined using the method described by G. W. SEARS in an article in "Analytical Chemistry, vol. 28, No. 12, December 1956", entitled "Determination of specific surface area of colloidal silica by titration with sodium hydroxide".

The Sears number is the volume of 0.1 M sodium hydroxide solution necessary to raise from 4 to 9 the pH of a suspension of silica of 10 g/l in a sodium chloride medium of 200 g/l.

For this, a solution of sodium chloride of 200 g/l acidified to pH 3 with a solution of 1 M hydrochloric acid is prepared from 400 grams of sodium chloride. The weighing operations are carried out using a METTLER precision balance. 150 ml of this solution of sodium chloride is added delicately to a 250 ml beaker into which a mass M (in g) of the sample to be analyzed corresponding to 1.5 grams of dry silica has been introduced beforehand. Ultrasound is applied to the dispersion obtained for 8 minutes (BRANSON 1500 W ultrasonic probe, amplitude 60%, diameter 13 mm), the beaker being in a crystallizer filled with ice. Then the solution obtained is homogenized by magnetic stirring, using a bar magnet of dimensions 25 mm×5 mm. It is checked that the pH of the suspension is less than 4, adjusting it if necessary with a 1 M hydrochloric acid solution. There is then added, using a Metrohm titrating pH meter (titroprocessor 672, dosimat 655), calibrated beforehand using buffer solutions of pH 7 and pH 4, a 0.1 M sodium hydroxide solution at a flow rate of 2 ml/min (the titrating pH meter was programmed as follows: 1) Call up the program "Get pH", 2) Enter the following parameters: pause (waiting time before the start of titration): 3 s, flow rate of reagent: 2 ml/min, anticipation (adaptation of the titration rate to the gradient of the pH curve): 30, stop pH: 9.40, critical EP (sensitivity of detection of the equivalence point): 3, report (impression parameters of the titration report): 2,3,5 (that is to say creation of a detailed report, list of measurement points, titration curve)). The exact volumes $V_1$ and $V_2$ of the sodium hydroxide solution added in order to obtain a pH of 4 and a pH of 9 respectively are determined by interpolation. The Sears number for 1.5 grams of dry silica is equal to $((V_2-V_1)\times 150)/(DE\times M)$, with:

$V_1$: volume of 0.1 M sodium hydroxide solution at $pH_1=4$ $V_2$: volume of 0.1 M sodium hydroxide solution at $pH_2=9$ M: mass of the sample (g)

DE: dry extract in %

I.1.5 Disagglomeration:

In some cases, the ability of a silica to disperse, in particular within an elastomeric matrix, can be evaluated by means of specific disagglomeration tests.

I.1.5.1 Disagglomeration Rate α:

The disagglomeration rate α is measured by means of an ultrasound disagglomeration test, at 100% power of a 600 W (watt) probe, operating here in pulse mode (namely: 1 second ON, 1 second OFF) in order to avoid excessive heating of the ultrasonic probe during the measurement. This known test, which is the subject in particular of patent application WO99/28376 (see also WO99/28380, WO00/73372, WO00/73373), makes it possible to measure continuously the change in the average size (by volume) of the agglomerates of particles during ultrasound generation, in accordance with the specifications hereafter.

The setup used is formed of a laser granulometer (type "Mastersizer S", sold by Malvern Instruments—He—Ne red laser source, wavelength 632.8 nm) and its preparer ("Malvern Small Sample Unit MSX1"), between which there has been inserted a continuous-flow treatment cell (Bioblock M72410) provided with an ultrasonic probe (600-watt ½ inch ultrasound generator type Vibracell sold by Bioblock).

A small quantity (150 mg) of silica to be analyzed is introduced into the preparer with 160 ml of water, the rate of circulation being set to its maximum. At least three consecutive measurements are taken to determine the initial mean diameter (by volume) of the agglomerates, referred to as $d_v[0]$, in accordance with the known Fraunhofer calculation method (Malvern 3$$D calculation matrix). The ultrasound generation (pulse mode: 1 sec ON, 1 sec OFF) is then established at a power of 100% (namely 100% of the maximum position of the "tip amplitude") and the evolution of the mean diameter by volume $d_v[t]$ as a function of the time "t" is monitored for about 8 minutes with one measurement approximately every 10 seconds. After an induction period (about 3-4 minutes), it was noted that the reciprocal of the mean diameter by volume $1/d_v[t]$ varies linearly, or substantially linearly, with the time "t" (stable disagglomeration conditions). The disagglomeration rate α is calculated by linear regression of the curve of evolution of $1/d_v[t]$ as a function of the time "t", within the zone of stable disagglomeration conditions (generally, between about 4 and 8 minutes). It is expressed in $\mu m^{-1}/min$.

The aforementioned application WO99/28376 describes in detail a measuring device usable for performing this ultrasound disagglomeration test. It will be recalled that this device consists of a closed circuit within which a flow of agglomerates of particles suspended in a liquid can circulate. This device essentially comprises a sample preparer, a laser granulometer and a treatment cell. A vent to atmospheric pressure, at the level of the sample preparer and of the treatment cell itself, permits continuous elimination of the air bubbles which form during ultrasound generation (action of the ultrasonic probe).

The sample preparer ("Malvern Small Sample Unit MSX1") is intended to receive the sample of silica to be tested (in suspension in the liquid) and to send it through the circuit at the pre-controlled speed (potentiometer—maximum speed of approximately 3 l/min), in the form of a flow of liquid suspension. This preparer consists simply of a receiving tank which contains, and through which circulates, the suspension to be analyzed. It is equipped with a stirrer motor of variable speed in order to prevent sedimentation of the agglomerates of particles of the suspension; a centrifugal mini-pump is intended to circulate the suspension in the circuit; the entrance to the preparer is connected to the open air via an opening intended to receive the sample of filler to be tested and/or the liquid used for the suspension.

To the preparer there is connected a laser granulometer ("Mastersizer S"), the role of which is to measure continuously, at regular intervals, the average size by volume "$d_v$" of the agglomerates as the flow passes, by means of a measuring cell to which are coupled the automatic recording and calculation means of the granulometer. It should be recalled here briefly that laser granulometers utilize, in known manner, the principle of diffraction of the light by solid objects suspended in a medium, the refractive index of which differs from that of the solid. According to the theory of Fraunhofer, there is a relationship between the size of the object and the angle of diffraction of light (the smaller the object, the greater the angle of diffraction). In practice, it is sufficient to measure the amount of light diffracted for different angles of diffraction to be able to determine the size distribution (by volume) of the sample, $d_v$ corresponding to the average size by volume of this distribution ($d_v=\Sigma(n_i d_i^4)/\Sigma(n_i d_i^3)$ with $n_i$ being the number of objects of the size class or diameter $d_i$).

Inserted between the preparer and the laser granulometer there is, finally, a processing cell equipped with an ultrasonic probe, capable of operating in continuous or pulse mode, intended continuously to break up the agglomerates of particles as the flow passes. This flow is thermostatically controlled by means of a cooling circuit arranged, at the level of the cell, in a double casing surrounding the probe, the temperature being controlled, for example, by a heat sensor immersed in the liquid at the level of the preparer.

I.1.5.2 Median Diameter and Disagglomeration Factor:

The ability of the silicas used according to the invention to disperse (and to disagglomerate) can be quantified by means of other disagglomeration tests.

Another disagglomeration test is carried out in accordance with the following protocol:

The cohesion of the agglomerates is assessed by a granulometric measurement (by laser diffraction), carried out on a suspension of silica which has been disagglomerated beforehand by ultrasound generation; thus the ability of the silica to disagglomerate (breaking of the objects of 0.1 to several tens of microns) is measured. The ultrasound disagglomeration is carried out using a VIBRACELL BIOBLOCK ultrasound generator (600 W), fitted with a probe of a diameter of 19 mm. The granulometric measurement is carried out by laser diffraction on a SYMPATEC granulometer.

2 grams of silica are weighed into a pill machine (height: 6 cm and diameter: 4 cm) and it is made up to 50 grams by addition of demineralized water: thus an aqueous suspension with 4% of silica is produced which is homogenized for 2 minutes by magnetic stirring. The ultrasound disagglomeration is then carried out as follows: the probe being immersed over a length of 4 cm, the output power is controlled so as to obtain a deflection of the needle of the power dial indicating 20%. The disagglomeration is carried out for 420 seconds. Then the granulometric measurement is carried out once a known volume (expressed in ml) of the homogenized suspension has been introduced into the tank of the granulometer.

The value of the median diameter $Ø_{50S}$ (or Sympatec median diameter) obtained is all the smaller the higher the disagglomeration ability of the silica. The ratio (10×volume of suspension introduced (in ml))/optical density of the suspension detected by the granulometer (this optical density is of the order of 20) can also be determined. This ratio is indicative of the amount of particles of a size less than 0.1 µm which are not detected by the granulometer. This ratio is referred to as ultrasound disagglomeration factor (Sympatec) (FDS).

Yet another disagglomeration test may be carried out in accordance with the following protocol:

The cohesion of the agglomerates is assessed by a granulometric measurement (by laser diffraction), carried out on a suspension of silica which has been disagglomerated beforehand by ultrasound generation; thus the ability of the silica to disagglomerate (breaking of the objects of 0.1 to several tens of microns) is measured. The ultrasound disagglomeration is carried out using a VIBRACELL BIOBLOCK ultrasound generator (600 W), used at 80% of maximum power, fitted with a probe of a diameter of 19 mm. The granulometric measurement is carried out by laser diffraction on a MALVERN granulometer (Mastersizer 2000).

1 gram of silica is weighed into a pill machine (height: 6 cm and diameter: 4 cm) and it is made up to 50 grams by addition of demineralized water: thus an aqueous suspension with 2% of silica is produced which is homogenized for 2 minutes by magnetic stirring. The ultrasound disagglomeration is then carried out for 420 seconds. Then the granulometric measurement is carried out once all of the homogenized suspension has been introduced into the tank of the granulometer.

The value of the median diameter $Ø_{50M}$ (or Malvern median diameter) obtained is all the smaller the higher the disagglomeration ability of the silica. The ratio (10×value of the obscuration of the blue laser)/value of the obscuration of the red laser can also be determined. This ratio is indicative of the amount of particles of a size less than 0.1 µm. This ratio is referred to as ultrasound disagglomeration factor (Malvern) (FDM).

I.2 Characterization of the Rubber Compositions

The diene rubber compositions are characterized, before and after curing, as indicated below.

I.2.1 Mooney Plasticity:

An oscillating consistometer such as described in French Standard NF T 43-005 (1991) is used. The Mooney plasticity is measured in accordance with the following principle: the composition in the uncured state (i.e. before curing) is molded in a cylindrical enclosure heated to 100° C. After one minute's preheating, the rotor turns within the test piece at 2 rpm, and the torque used for maintaining this movement is measured after four minutes' rotation. The Mooney plasticity (ML 1+4) is expressed in "Mooney units" (MU, with 1 MU=0.83 Newton.meter).

I.2.2 Bound Rubber:

The so-called "bound rubber" test makes it possible to determine the proportion of elastomer, in a non-vulcanized composition, which is associated so intimately with the reinforcing filler that this proportion of elastomer is insoluble in the usual organic solvents. Knowledge of this insoluble proportion of rubber, linked with the reinforcing filler during mixing, gives a quantitative indication of the reinforcing activity of the filler in the rubber composition. Such a method has been described, for example, in French Standard NF T 45-114 (June 1989) applied to the determination of the amount of elastomer bound to the carbon black.

This test, which is well-known to the person skilled in the art for characterizing the quality of reinforcement provided by the reinforcing filler, has been described, for example, in the following documents: *Plastics, Rubber and Composites Processing and Applications*, Vol. 25, No. 7, p. 327 (1996); *Rubber Chemistry and Technology*, Vol. 69, p. 325 (1996).

In the present case, the amount of elastomer which cannot be extracted with toluene is measured, after swelling for 15 days of a sample of rubber composition (typically 300-350 mg) in this solvent (for example in 80-100 cm³ of toluene), followed by a 24-hour drying step at 100° C., in a vacuum, before weighing the sample of rubber composition thus treated. Preferably, the above swelling step is carried out at ambient temperature (approximately 20° C.) and protected from light, and the solvent (toluene) is changed once, for example after the first five days' swelling.

The amount of "bound rubber" (% by weight), "BR", is calculated in known manner by the difference between the initial weight and the final weight of the sample of rubber composition, after making allowance for in and eliminating from the calculation that fraction of the components which are insoluble by nature, other than the elastomer, which are initially present in the rubber composition.

I.2.3 Rheometry:

The measurements are effected at 150° C. with an oscillating-chamber rheometer, in accordance with DIN Standard 53529—part 3 (June 1983). The evolution of the rheometric torque as a function of time describes the evolution of the stiffening of the composition following the vulcanization reaction. The measurements are processed in accordance with DIN Standard 53529—part 2 (March 1983): $t_i$ is the induction delay, that is to say, the time necessary for the start of the vulcanization reaction; $t_\alpha$ (for example t90) is the time necessary to achieve a conversion of α %, that is to say α % (for example 90%) of the deviation between the minimum and maximum torques. The conversion rate constant K (expressed in min-1) of order 1, calculated between 30% and 80% conversion, is also measured, which makes it possible to assess the vulcanization kinetics.

I.2.4 Tensile Tests:

These tests make it possible to determine the elasticity stresses and the properties at break. Unless indicated otherwise, they are effected in accordance with Standard AFNOR NF T 46-002 of September 1988.

The nominal secant moduli (or apparent stresses, in MPa) at 10% elongation (MA10), 100% elongation (MA100) and 300% elongation (MA300) are measured in a second elongation (i.e. after an accommodation cycle).

All these tensile measurements are effected under normal conditions of temperature (23±2° C.) and humidity (50±5% relative humidity), in accordance with French Standard NF T 40-101 (December 1979).

Processing the tensile data recorded also makes it possible to trace the curve of the modulus as a function of the elongation (see attached FIG. 1), the modulus used here being the true secant modulus measured in a first elongation, calculated reduced to the real cross-section of the test piece and not to the initial section as previously for the nominal moduli.

I.2.5 Dynamic Properties:

The dynamic properties $\Delta G^*$ and $\tan(\delta)$max are measured on a viscoanalyser (Metravib VA4000), in accordance with ASTM Standard D 5992-96. The response of a sample of vulcanized composition (cylindrical test piece of a thickness of 4 mm and a section of 400 mm$^2$), subjected to an alternating single sinusoidal shearing stress, at a frequency of 10 Hz, under normal conditions of temperature (23° C.) in accordance with Standard ASTM D 1349-99, or at a different temperature, depending on the case, is recorded. Scanning is effected at an amplitude of deformation of 0.1 to 50% (outward cycle), then of 50% to 1% (return cycle). The results used are the complex dynamic shear modulus ($G^*$) and the loss factor $\tan(\delta)$. For the return cycle, the maximum value of $\tan(\delta)$ which is observed, $\tan(\delta)$max, is indicated, as is the deviation in the complex modulus ($\Delta G^*$) between the values at 0.15 and 50% deformation (Payne effect).

I.2.6 Shore A Hardness:

The Shore A hardness of the compositions after curing is assessed in accordance with ASTM Standard D 2240-86.

I.3 Characterization of the Tires or Treads

I.3.1 Rolling Resistance:

The rolling resistance is measured on a test drum, in accordance with method ISO 87-67 (1992). A value greater than that of the control, which is arbitrarily set to 100, indicates an improved result, that is to say a lower rolling resistance.

I.3.2 Wear Resistance:

The tires are subjected to actual on-road travel on a given automobile, until the wear due to running reaches the wear indicators located in the grooves of the tread. A value greater than that of the control, arbitrarily set to 100, indicates an improved result, that is to say a greater mileage traveled.

II. CONDITIONS OF CARRYING OUT THE INVENTION:

According to the invention, the diene rubber compositions for tires (that is to say those intended for the manufacture of tires or of semi-finished products made of rubber intended for the production of these tires) according to the invention are based on at least:

(i) a diene elastomer;
(ii) as reinforcing filler, an inorganic filler constituted in its entirety or in part by a specific silica;
(iii) a coupling agent providing the bond between the inorganic filler and the diene elastomer.

Of course, the expression composition "based on" is to be understood to mean a composition comprising the mix and/or the product of reaction in situ of the various constituents used, some of these base constituents being liable to, or intended to, react together, at least in part, during the different phases of manufacture of the treads and tires, in particular during the vulcanization thereof.

II.1 Diene Elastomer

"Diene" elastomer (or rubber) is understood to mean, in known manner, an elastomer resulting at least in part (i.e. a homopolymer or a copolymer) from diene monomers, that is to say, monomers bearing two carbon-carbon double bonds, whether conjugated or not.

"Essentially unsaturated" diene elastomer is understood here to mean a diene elastomer resulting at least in part from conjugated diene monomers, having a content of members or units of diene origin (conjugated dienes) which is greater than 15% (mol %).

Thus, for example, diene elastomers such as butyl rubbers or copolymers of dienes and of alpha-olefins of the EPDM type do not fall within the preceding definition, and may in particular be described as "essentially saturated" diene elastomers (low or very low content of units of diene origin which is always less than 15%).

Within the category of "essentially unsaturated" diene elastomers, "highly unsaturated" diene elastomer is understood to mean in particular a diene elastomer having a content of units of diene origin (conjugated dienes) which is greater than 50%.

These general definitions being given, the person skilled in the art of tires will understand that the present invention is used first and foremost with highly unsaturated diene elastomers, in particular with:

(a) any homopolymer obtained by polymerization of a conjugated diene monomer having 4 to 12 carbon atoms;
(b) any copolymer obtained by copolymerization of one or more dienes conjugated together or with one or more vinyl-aromatic compounds having 8 to 20 carbon atoms;
(c) a ternary copolymer obtained by copolymerization of ethylene, of an α-olefin having 3 to 6 carbon atoms with a non-conjugated diene monomer having 6 to 12 carbon atoms, such as, for example, the elastomers obtained from ethylene, from propylene with a non-conjugated diene monomer of the aforementioned type, such as in particular 1,4-hexadiene, ethylidene norbornene or dicyclopentadiene;
(d) a copolymer of isobutene and isoprene (butyl rubber), and also the halogenated, in particular chlorinated or brominated, versions of this type of copolymer.

Although it applies to any type of diene elastomer, the person skilled in the art of tires will understand that the present invention, in particular when the rubber composition is intended for a tire tread, is used first and foremost with essentially unsaturated diene elastomers, in particular those of type (a) or (b) above.

Suitable conjugated dienes are, in particular, 1,3-butadiene, 2-methyl-1,3-butadiene, 2,3-di(C1-C5 alkyl)-1,3-butadienes such as, for instance, 2,3-dimethyl-1,3-butadiene, 2,3-diethyl-1,3-butadiene, 2,3-dimethyl-3-ethyl-1,3-butadiene, 2-methyl-3-isopropyl-1,3-butadiene, an aryl-1,3-butadiene, 1,3-pentadiene and 2,4-hexadiene. Suitable vinyl-aromatic compounds are, for example, styrene, ortho-, meta- and para-methylstyrene, the commercial mixture "vinyltoluene", para-tert. butylstyrene, methoxystyrenes, chlorostyrenes, vinylmesitylene, divinylbenzene and vinylnaphthalene.

The copolymers may contain between 99% and 20% by weight of diene units and between 1% and 80% by weight of vinyl-aromatic units. The elastomers may have any microstructure, which is a function of the polymerisation conditions used, in particular of the presence or absence of a modifying and/or randomizing agent and the quantities of modifying and/or randomizing agent used. The elastomers may for example be block, statistical, sequential or microsequential elastomers, and may be prepared in a dispersion or in solution; they may be coupled and/or starred or alternatively functionalized with a coupling and/or starring or functionalizing agent.

The diene elastomer of the tread according to the invention is preferably constituted, in its entirety or in part, more preferably to at least 50 phr, by a highly unsaturated elastomer of the butadiene type, that is to say selected from the group of the highly unsaturated diene elastomers constituted by polybutadienes (BR), butadiene copolymers and mixtures of these elastomers. These butadiene copolymers are in particular butadiene-styrene copolymers (SBR), butadiene-isoprene copolymers (BIR) or isoprene-butadiene-styrene copolymers (SBIR).

Suitable preferred butadiene elastomers are in particular BRs having a content of 1,2-units of between 4% and 80% or those having a content of cis-1,4 greater than 80%, SBRs having a styrene content of between 5% and 50% by weight and more particularly between 20% and 40%, a content of –1,2 bonds of the butadiene fraction of between 4% and 65%, a content of trans-1,4 bonds of between 20% and 80%, BIRs having an isoprene content of between 5% and 90% by weight and a glass transition temperature ("Tg" measured in accordance with ASTM Standard D3418-82) of –40° C. to –80° C. In the case of SBIR copolymers, those which are suitable are in particular those having a styrene content of between 5% and 50% by weight and, more particularly, between 10% and 40%, an isoprene content of between 15% and 60% by weight, and more particularly between 20% and 50%, a butadiene content of between 5% and 50% by weight, and more particularly between 20% and 40%, a content of 1,2-units of the butadiene fraction of between 4% and 85%, a content of trans-1,4 units of the butadiene fraction of between 6% and 80%, a content of 1,2-plus 3,4-units of the isoprene fraction of between 5% and 70%, and a content of trans-1,4 units of the isoprene fraction of between 10% and 50%, and more generally any SBIR having a Tg of between –20° C. and –70° C.

In summary, particularly preferably, the diene elastomer of the tire composition according to the invention is selected from the group of highly unsaturated diene elastomers which consists of polybutadienes (BR), polyisoprenes (IR), natural rubber (NR), butadiene copolymers, isoprene copolymers and mixtures of these elastomers. Such copolymers are more preferably selected from the group which consists of butadiene-styrene copolymers (SBR), isoprene-butadiene copolymers (BIR), isoprene-styrene copolymers (SIR) and isoprene-butadiene-styrene copolymers (SBIR).

The tire composition according to the invention is particularly intended for a tread for a tire, be it a new or a used tire (recapping).

The butadiene elastomer is particularly selected from among the BRs, the SBRs and mixtures of these elastomers.

Preferably, in the case of a rubber composition for a tire for passenger vehicles, the butadiene elastomer is majoritarily an SBR elastomer, be it an SBR prepared in emulsion ("ESBR") or an SBR prepared in solution ("SSBR"), or a mixture of SBR and another diene elastomer, in particular a butadiene elastomer, for example of a blend of SBR and BR, of SBR and NR (natural rubber), or of SBR and IR (synthetic polyisoprene).

In particular an SBR having a styrene content of between 20% and 30% by weight, a content of vinyl bonds of the butadiene fraction of between 15% and 65%, a content of trans-1,4 bonds of between 15% and 75%, and a Tg of between –20° C. and –55° C. is used. Such an SBR copolymer, preferably an SSBR, is possibly used in a mixture with BR having preferably more than 90% cis-1,4 bonds.

In the case of a tire for a utility vehicle, in particular for a heavy vehicle—i.e. subway trains, bus, road transport machinery (lorries, tractors, trailers), off-road vehicles—the diene component is for example selected from the group consisting of natural rubber, synthetic polyisoprenes, isoprene copolymers (isoprene-butadiene, isoprene-styrene, butadiene-styrene-isoprene) and mixtures of these elastomers. In such a case, the diene component may also be constituted, in its entirety or in part, of another highly unsaturated elastomer such as, for example, an SBR elastomer.

According to another advantageous embodiment of the invention, in particular when it is intended for a tire sidewall, the composition according to the invention may contain at least one essentially saturated diene elastomer, in particular at least one EPDM copolymer, whether this copolymer be used or not used, for example, in a mixture with one or more of the highly unsaturated diene elastomers mentioned above.

The diene rubber compositions for tires of the invention may contain a single diene elastomer or a mixture of several diene elastomers, the diene elastomers possibly being used in association with any type of synthetic elastomer other than a diene elastomer, or even with polymers other than elastomers, for example thermoplastic polymers.

II.2 Reinforcing Inorganic Filler

It will be recalled that "reinforcing inorganic filler" is to be understood in known manner to mean an inorganic or mineral filler, whatever its color and its origin (natural or synthetic), also referred to as "white" filler or sometimes "clear" filler, in contrast to conventional carbon black, which is capable, on its own, without any other means than an intermediate coupling agent, of reinforcing a diene rubber composition intended for the manufacture of tires, in other words which is capable of replacing a conventional tire-grade carbon black filler in its reinforcement function.

The diene rubber composition for tires (that is to say one intended for the manufacture of tires or of semi-finished products made of rubber intended for the production of these tires) has the essential characteristic, in accordance with a first aspect of the invention, of being reinforced by a reinforcing inorganic filler comprising, preferably in a majority proportion, a specific silica obtainable by a process comprising the reaction of a silicate with an acidifying agent by means of which a suspension of silica is obtained, then the separation and the drying of this suspension.

This process is characterized in that the reaction of the silicate with the acidifying agent is carried out in accordance with the following successive steps:

(α) an aqueous stock having a pH of between 2 and 5 is formed, (β) silicate and acidifying agent is added to said aqueous stock, simultaneously, such that the pH of the reaction medium is kept between 2 and 5, (γ) the addition of the acidifying agent is stopped while the addition of silicate to the reaction medium is continued until a value of the pH of the reaction medium of between 7 and 10 is obtained, (δ) silicate and acidifying agent are added to the reaction medium, simultaneously, such that the pH of the reaction medium is kept between 7 and 10, (ε) the addition of the silicate is stopped while the addition of the acidifying agent to the reaction medium is continued until a value of the pH of the reaction medium of less than 6 is obtained.

The acidifying agent and the silicate are selected in a manner well-known per se.

A strong mineral acid, such as sulfuric acid, nitric acid or hydrochloric acid, or an organic acid such as acetic acid, formic acid or carbonic acid, is generally used as acidifying agent.

The acidifying agent may be diluted or concentrated; its normality may be of between 0.4 and 36 N, for example between 0.6 and 1.5 N.

In particular, in the case in which the acidifying agent is sulfuric acid, its concentration may be of between 40 and 180 g/l, for example between 60 and 130 g/l.

Furthermore, it is possible to use as silicate any common form of silicates such as metasilicates, disilicates and advantageously an alkali metal silicate, in particular sodium or potassium silicate.

The silicate may have a concentration (expressed in $SiO_2$) of between 40 and 330 g/l, for example between 60 and 300 g/l, in particular between 60 and 260 g/l.

Generally, sulfuric acid is used as acidifying agent, and sodium silicate is used as silicate.

In the case in which sodium silicate is used, the latter generally has a weight ratio $SiO_2/Na_2O$ of between 2.5 and 4, for example between 3.2 and 3.8.

As far as more particularly the preparation process of the invention is concerned, the reaction of the silicate with the acidifying agent takes place very specifically in accordance with the following steps.

First of all an aqueous stock having a pH of between 2 and 5 is formed.

Preferably, the aqueous stock formed has a pH of between 2.5 and 5, in particular between 3 and 4.5; this pH is for example of between 3.5 and 4.5.

This initial aqueous stock may be obtained by adding acidifying agent to water so as to obtain a pH value of the stock of between 2 and 5, preferably between 2.5 and 5, in particular between 3 and 4.5 and for example between 3.5 and 4.5.

It may be also obtained by adding acidifying agent to a water+silicate mixture so as to obtain this pH value.

It may also be prepared by adding acidifying agent to a stock containing silica particles formed beforehand at a pH of less than 7, so as to obtain a pH value of between 2 and 5, preferably between 2.5 and 5, in particular between 3 and 4.5 and for example between 3.5 and 4.5.

The aqueous stock formed in step (α) may possibly comprise an electrolyte. Nevertheless, preferably, no electrolyte is added during the preparation process, in particular in step (α).

The term "electrolyte" is understood here in its normal accepted meaning, that is to say that it means any ionic or molecular substance which, when in solution, is decomposed or dissociates to form ions or charged particles.

Mention may be made, as electrolyte, of a salt of the group of alkali and alkaline-earth metal salts, in particular the salt of the starting silicate metal and of the acidifying agent, for example sodium chloride in the case of the reaction of a sodium silicate with hydrochloric acid or, preferably, sodium sulfate in the case of the reaction of a sodium silicate with sulfuric acid.

The second step (step (β)) consists of a simultaneous addition of acidifying agent and silicate, such (in particular at flow rates such) that the pH of the reaction medium is kept between 2 and 5, preferably between 2.5 and 5, in particular between 3 and 4.5, for example between 3.5 and 4.5.

This simultaneous addition is advantageously effected such that the value of the pH of the reaction medium is constantly equal (to within ±0.2) to that achieved at the end of the initial step (α).

Then, in a step (γ), the addition of the acidifying agent is stopped while the addition of silicate to the reaction medium is continued so as to obtain a value of the pH of the reaction medium of between 7 and 10, preferably between 7.5 and 9.5.

It may then be advantageous to effect, just after this step (γ) and therefore just after the addition of silicate has been stopped, maturation of the reaction medium, in particular at the pH obtained at the end of step (γ), and generally with stirring; this maturation may for example last from 2 to 45 minutes, in particular from 5 to 25 minutes, and preferably comprises neither the addition of acidifying agent nor the addition of silicate.

After step (γ) and any maturation, once again simultaneous addition of acidifying agent and silicate is effected, such (in particular at flow rates such) that the pH of the reaction medium is kept between 7 and 10, preferably between 7.5 and 9.5.

This second simultaneous addition (step (δ)) is advantageously effected such that the value of the pH of the reaction medium is constantly equal (to within ±0.2) to that achieved at the end of the preceding step.

It should be noted that, between step (γ) and step (δ), for example between, on one hand, any maturation following step (γ), and, on the other hand, step (δ), acidifying agent may be added to the reaction medium, the pH of the reaction medium at the end of this addition of acidifying agent however being of between 7 and 9.5, preferably between 7.5 and 9.5.

Finally, in a step (ε), the addition of the silicate is stopped while the addition of acidifying agent to the reaction medium is continued so as to obtain a value of the pH of the reaction medium less than 6, preferably of between 3 and 5.5, in particular between 3 and 5, for example between 3 and 4.5.

It may then be advantageous, after this step (ε) and therefore just after the addition of the acidifying agent has been stopped, to effect maturation of the reaction medium, in particular at the pH obtained at the end of step (ε), and generally with stirring; this maturation may for example last from 2 to 45 minutes, in particular from 5 to 20 minutes and preferably comprises neither the addition of acidifying agent, nor the addition of silicate.

The reaction enclosure in which the entire reaction of the silicate with the acidifying agent is implemented is usually provided with suitable stirring fittings and heating fittings.

The entire reaction of the silicate with the acidifying agent is generally carried out between 70 and 95° C., in particular between 75 and 90° C.

According to one variant of the invention, the entire reaction of the silicate with the acidifying agent is carried out at a constant temperature, usually of between 70 and 95° C., in particular between 75 and 90° C.

According to another variant of the invention, the temperature of the end of the reaction is higher than the temperature of the start of the reaction: thus, the temperature at the start of the reaction (for example during steps (α) to (γ)) is preferably kept between 70 and 85° C., then the temperature is increased, preferably to a value of between 85 and 95° C., at which value it is kept (for example during steps (δ) and (ε) until the end of the reaction.

At the end of the steps which have just been described, a silica slurry is obtained which is then separated (liquid-solid separation).

The separation carried out in this preparation process usually comprises filtration, followed by washing if necessary. The filtration is effected using any suitable method, for example by means of a filter press, a belt filter or a vacuum filter.

The silica suspension thus recovered (filter cake) is then dried.

This drying may be effected by any means known per se.

Preferably, the drying is effected by spraying. To this end, any type of suitable sprayer may be used, in particular a turbine sprayer, nozzle sprayer, liquid-pressure sprayer or a dual-fluid sprayer. Generally, when the filtration is carried out using a filter press, a nozzle sprayer is used, and, when the filtration is carried out using a vacuum filter, a turbine sprayer is used.

It should be noted that the filter cake is not always under conditions which permit spraying in particular owing to its high viscosity. In a manner known per se, the cake is then subjected to a disintegration operation. This operation may be carried out mechanically, by passing the cake into a mill of colloid or ball type. The disintegration is generally carried out in the presence of an aluminum compound, in particular sodium aluminate and, possibly, in the presence of an acidifying agent such as described previously (in this latter case, the aluminum compound and the acidifying agent are generally added simultaneously). The disintegration operation makes it possible in particular to lower the viscosity of the suspension to be dried later.

When the drying is carried out using a nozzle sprayer, the silica then obtainable is usually in the form of substantially spherical balls.

At the end of the drying operation, a crushing step can then be performed on the recovered product. The silica which is then obtainable is generally in the form of a powder.

When the drying is carried out using a turbine sprayer, the silica then obtainable may be in the form of a powder.

Finally, the product dried (in particular by a turbine sprayer) or crushed as indicated previously may possibly be subjected to an agglomeration step, which consists for example of direct compression, wet granulation (that is to say with use of a binder such as water, silica suspension, etc.), extrusion or, preferably, dry compacting. When the latter technique is implemented, it may prove advisable, before compacting, to deaerate (operation also referred to as predensification or degassing) the powdered products so as to eliminate the air included therein and to ensure more regular compacting.

The silica obtainable by this agglomeration step is generally in the form of granules.

The powders, like the balls, of silica obtained by the process described further above thus provide the advantage, inter alia, of having access, simply, effectively and economically, to granules, in particular by conventional shaping operations, such as for example granulation or compacting, without them involving degradation liable to mask, or even ruin, the good intrinsic properties associated with these powders or these balls, as may be the case in the prior art using conventional powders.

This preparation process makes it possible to obtain precipitated silicas, which, on one hand, are non-friable, which is advantageous from the point of view of the handling and transport of the products on industrial installations, and, on the other hand, generally have a satisfactory ability to disperse (dispersibility) in the polymers, impart thereto a very satisfactory compromise of properties, in particular in terms of their rheological and dynamic properties, and have a good reinforcement effect.

The silicas obtained using this original process can advantageously be used as reinforcing fillers in diene rubber compositions intended for the manufacture of tires. They impart thereto very satisfactory dynamic properties, without adversely affecting the rheological properties. They then advantageously have a BET specific surface area of between 45 and 400, preferably between 80 and 300 m$^2$/g, a CTAB specific surface area of between 40 and 380, preferably between 70 and 280 m$^2$/g, and an average particle size (by mass), $d_w$, of from 20 to 300 nm.

More particularly, the silicas obtained using this original process and having a BET specific surface area of between 130 and 300, a CTAB specific surface area of between 120 and 280 and an average particle size (by mass), $d_w$, of from 20 to 300 nm, may advantageously be used as reinforcing fillers in diene rubber compositions in particular intended for the manufacture of treads for tires, because they induce a significant improvement in the compromise of the tire performances.

The diene rubber compositions for tires (that is to say those intended for the manufacture of tires or of semi-finished products made of rubber intended for the production of these tires) comprising, as reinforcing fillers, silicas obtainable by this process constitute one of the aspects of the invention.

According to another aspect of the invention, the diene rubber composition for tires (that is to say which is intended for the manufacture of tires or of semi-finished products made of rubber intended for the production of these tires) according to the invention has the essential characteristic of being reinforced by a reinforcing inorganic filler comprising, preferably in a majority proportion, a specific silica which has the following characteristics:

(a) BET specific surface area of between 45 and 400, and preferably between 50 and 300 m$^2$/g;

(b) a CTAB specific surface area of between 40 and 380, and preferably between 45 and 280 m$^2$/g;

(c) an average particle size (by mass), $d_w$, of 20 to 300 nm;

and at least one of the following characteristics, preferably two and more preferably all three:

(d) a particle size distribution such that dw≧(16,500/ CTAB)−30;

(e) a porosity which meets the criterion L/FI≧−0.0025 CTAB+0.85;

(f( ) an amount of silanols per unit of surface area, $N_{SiOH/nm^2}$, $N_{SiOH/nm^2}$≦−0.027 CTAB+10.5.

For example, the specific silica used in the compositions according to the invention has an average particle size, $d_w$, of from 40 to 150 nm.

The invention also proposes defining this other aspect of the invention in accordance with the following variants.

According to a first variant definition of this other aspect of the invention, the diene rubber composition for tires (that is to say which is intended for the manufacture of tires or of semi-finished products made of rubber intended for the production of these tires) according to the invention is reinforced by a reinforcing inorganic filler comprising, preferably in a majority proportion, a novel silica characterized in that it possesses, in addition to the characteristics a) to c) previously described, at least one of the following characteristics and more particularly both:

(h) a size distribution width Ld ((d84-d16)/d50) of objects measured by XDC granulometry after ultrasound disagglomeration of at least 0.91, in particular of at least 0.94, and
(i) a distribution of the pore volume as a function of the size of the pores such that the ratio $V_{(d5-d50)}/V_{(d5-d100)}$ is at least 0.66, in particular at least 0.68.

The silica according to this variant has for example:

(h) a size distribution width Ld ((d84-d16)/d50) of objects measured by XDC granulometry after ultrasound disagglomeration of at least 1.04, and
(i) a distribution of the pore volume as a function of the size of the pores such that the ratio $V_{(d5-d50)}/V_{(d5-d100)}$ is at least 0.71.

This silica may have a ratio $V_{(d5-d50)}/V_{(d5-d100)}$ of at least 0.73, in particular at least 0.74. This ratio may be at least 0.78, in particular at least 0.80, or even at least 0.84.

Another variant definition of this other aspect of the invention consists in a diene rubber composition for tires (that is to say which is intended for the manufacture of tires or of semi-finished products made of rubber intended for the production of these tires) reinforced by a reinforcing inorganic filler comprising, preferably in a majority proportion, a novel silica characterized in that it possesses, in addition to the characteristics a) to c) previously described, at least a pore distribution width pdw greater than 0.70, in particular greater than 0.80, notably greater than 0.85.

This silica may have a pore distribution width pdw greater than 1.05, for example greater than 1.25, or even greater than 1.40.

The silica according to this variant preferably has a size distribution width Ld ((d84-d16)/d50) of objects measured by XDC granulometry after ultrasound disagglomeration of at least 0.91, in particular of at least 0.94, for example of at least 1.0.

Yet another variant definition of this other aspect of the invention consists in a diene rubber composition for tires (that is to say which is intended for the manufacture of tires or of semi-finished products made of rubber intended for the production of these tires) reinforced by a reinforcing inorganic filler comprising, preferably in a majority proportion, a novel silica characterized in that it possesses, in addition to the characteristics a) to c) previously described, at least one of the following characteristics, and more particularly both:

(h) a size distribution width L'd((d84-d16)/d50) of objects less than 500 nm, measured by XDC granulometry after ultrasound disagglomeration, of at least 0.95, and
(i) a distribution of the pore volume as a function of the size of the pores such that the ratio $V_{(d5-d50)}/V_{(d5-d100)}$ is at least 0.71.

This silica may have a distribution of the pore volume as a function of the size of the pores such that the ratio $V_{(d5-d50)}/V_{(d5-d100)}$ [is] of at least 0.73, in particular at least 0.74. This ratio may be at least 0.78, in particular at least 0.80, or even at least 0.84.

Another variant definition of this other aspect of the invention consists in a diene rubber composition for tires (that is to say which is intended for the manufacture of tires or of semi-finished products made of rubber intended for the production of these tires) according to the invention reinforced by a reinforcing inorganic filler comprising, preferably in a majority proportion, a novel silica characterized in that it possesses, in addition to the characteristics a) to c) previously described, at least one of the following characteristics, and more particularly both:

(h) a size distribution width L'd ((d84-d16)/d50) of objects less than 500 nm, measured by XDC granulometry after ultrasound disagglomeration, of at least 0.90, in particular of at least 0.92, and
(i) a distribution of the pore volume as a function of the size of the pores such that the ratio $V_{(d5-d50)}/V_{(d5-d100)}$ is at least 0.74.

This silica may have a ratio $V_{(d5-d50)}/V_{(d5-d100)}$ of at least 0.78, in particular at least 0.80, or even at least 0.84.

The silicas according to these variants may have both a size distribution width Ld of objects of at least 1.04 and a size distribution width L'd of objects (less than 500 nm) of at least 0.95. The size distribution width Ld of objects of the silicas is generally at least 1.10, in particular at least 1.20. It may be at least 1.30, for example at least 1.50, or even at least 1.60. The size distribution width L'd of objects (less than 500 nm) of the silicas may be at least 1.0, in particular at least 1.10, in particular at least 1.20.

The silicas used in the diene rubber compositions for tires, according to the invention, may have a ratio ((Sears number×100)/BET specific surface area ($S_{BET}$)) less than 60, preferably less than 55.

The silicas used in the diene rubber compositions for tires may have a high and therefore atypical size of objects, which is such that the mode of their granulometric distribution measured by XDC granulometry after ultrasound disagglomeration (in water) satisfies the condition: XDC Mode (nm)≧(5320/SCTAB (m²/g))+8, preferably the condition: XDC Mode (nm)≧(5320/SCTAB (m²/g))+10.

The silicas used in the diene rubber compositions for tires, according to the variants of the invention may have for example a pore volume (V80) constituted by the pores of diameters of between 3.7 and 80 nm of at least 1.35 cm³/g, in particular of at least 1.40 cm³/g, or even of at least 1.50 cm³/g.

In the silicas used according to the invention, the pore volume supplied by the largest pores represents the major part of its structure.

The silicas used in the diene rubber compositions for tires according to the invention preferably have a satisfactory ability to disperse in the matrices of diene elastomers.

Advantageously, the silicas used in the diene rubber compositions for tires according to the invention have a disagglomeration rate α, measured by means of an ultrasound disagglomeration test, at 100% power of a 600 W (watt) probe, operating in pulse mode (1 s ON, 1 s OFF), greater than or equal to 0.0035 $\mu m_{-1}$/min, for example of at least 0.0037 $\mu m^{-1}$/min (characteristic (g)).

Their median diameter ($\emptyset_{50S}$), after ultrasound disagglomeration, may be less than 8.5 μm; it may be less than 6.0 μm, for example less than 5.5 μm.

Likewise, their median diameter ($\emptyset_{50M}$), after ultrasound disagglomeration, may be less than 8.5 μm; it may be less than 6.0 μm, for example less than 5.5 μm.

The silicas according to the invention may have an ultrasound disagglomeration factor ($F_{DS}$) greater than 3 ml, in particular greater than 3.5 ml, notably greater than 4.5 ml.

Their ultrasound disagglomeration factor ($F_{DM}$) may be greater than 6, in particular greater than 7, notably greater than 11.

The silicas used as reinforcing fillers in the compositions according to the invention may have a certain microporosity; thus, the silicas used according to the invention are usually such that $(S_{BET}-S_{CTAB}) \geq 5$ m²/g, preferably $\geq 15$ m²/g, for example $\geq 25$ m²/g.

This microporosity is not generally too great; the silicas used according to the invention are generally such that $(S_{BET}-S_{CTAB}) < 50$ m²/g, preferably $<40$ m²/g.

The pH (measured in accordance with Standard ISO 787/9 (pH of a 5% suspension in water)) of the silicas according to the invention may be of between 6.3 and 7.8, in particular between 6.6 and 7.5.

They may have an oil absorption DOP (determined in accordance with Standard NF T 30-022 (March 1953) using dioctylphthalate) varying, most frequently, between 220 and 330 ml/100 g, for example between 240 and 300 ml/100 g.

Such silicas, usable as reinforcing fillers in compositions according to the invention, are obtainable with the original preparation process described further above.

The compositions according to the invention comprising such silicas as reinforcing fillers, preferably having all the characteristics a) to f), and obtained according to this original process constitute a particular implementation of the invention.

Of these novel silicas, it turns out that the silicas having a high specific surface area, used as reinforcing fillers in the compositions for tires according to the invention, result in levels of reinforcement and dispersibility which are surprising and unexpected for such surfaces, particularly when these compositions are used in passenger-car tire treads. These rubber compositions according to the invention then make it possible to achieve compromises of tire performances which are significantly improved.

Thus the silicas used according to the invention preferably have: a BET surface area of between 130 and 300 m²/g and a CTAB surface area of between 120 and 280 m²/g. For example, these silicas have: a BET surface area of between 150 and 280 m²/g and a CTAB surface area of between 145 and 260 m²/g.

The physical state in which the specific reinforcing silicas may be present is immaterial, be it in the form of a powder, microbeads, granules, pellets, balls or any other densified form, provided, of course, that the mode of densification does not adversely affect the essential or preferred characteristics advocated for these fillers.

By way of example, they may be in the form of substantially spherical balls of an average size of at least 80 μm.

This average size of balls may be of at least 100 μm, for example of at least 150 μm; it is generally at most 300 μm and is preferably between 100 and 270 μm. This average size is determined in accordance with Standard NF X 11507 (December 1970) by dry sieving and determination of the diameter corresponding to a cumulative oversize of 50%.

Or alternatively, the silicas usable as reinforcing fillers in the compositions according to the invention may also be in the form of a powder of an average size of at least 15 μm; this is for example of between 15 and 60 μm (in particular between 20 and 45 μm) or between 30 and 150 μm (in particular between 45 and 120 μm).

They may also be in the form of granules of a size of at least 1 mm, in particular of between 1 and 10 mm, along the axis of their greatest dimension (length).

The silicas, prepared in accordance with the preparation process described further above and/or having the characteristics described above, impart, in particular to tire treads manufactured from a diene rubber composition according to the invention containing them, a compromise of properties which is particularly advantageous from the point of view of the tire performance. Thus, a surprising significant improvement in the wear resistance and an equally unexpected reduction in the rolling resistance of the treads for tires manufactured with compositions according to the invention is noted.

The silica above may advantageously constitute the entire reinforcing inorganic filler.

However, at least one other conventional reinforcing inorganic filler may possibly be associated with this silica. In such a case, the silica used according to the invention preferably constitutes at least 50% by weight of the total reinforcing inorganic filler, more preferably still more than 80% by weight of this total reinforcing inorganic filler.

By way of example of a conventional reinforcing inorganic filler usable if applicable as a supplement, mention will be made in particular of highly dispersible silicas such as the silicas BV3380 and Ultrasil 7000 from Degussa, the silicas Zeosil 1165MP and 1115MP from Rhodia, the silica Hi-Sil 2000 from PPG, the silicas Zeopol 8715 or 8745 from Huber, the treated precipitated silicas such as, for example, the aluminum-"doped" silicas described in the aforementioned application EP-A-0735088, or alternatively highly dispersible reinforcing aluminas such as described in the application EP-A-0810258, for example aluminas A125 or CR125 from Baïkowski.

The person skilled in the art will understand that, as filler equivalent to such a supplementary reinforcing inorganic filler, there could be used a reinforcing filler of organic type, in particular a carbon black for tires, covered at least in part with an inorganic layer, in particular of silica, which for its part requires the use of a coupling agent to provide the connection to the elastomer.

With the silica there may be also associated a conventional tire-grade carbon black, in particular the blacks of the type HAF, ISAF, SAF which are conventionally used in treads of tires (for example, blacks N115, N134, N234, N339, N347, N375). This carbon black is then preferably used in a small proportion, in an amount of between preferably 2 and 20 phr, more preferably within a range from 5 to 15 phr. Within the ranges indicated, there is a benefit to be had from the coloring properties (black pigmentation agent) and anti-UV properties of the carbon blacks, without furthermore adversely affecting the typical performance provided by the silica.

Preferably, the amount of total reinforcing filler (reinforcing inorganic filler plus carbon black if applicable) lies in a range from 20 to 300 phr, more preferably from 30 to 150 phr, even more preferably from 50 to 130 phr (parts by weight to one hundred parts of elastomer), the optimum differing according to the nature of the reinforcing inorganic filler used and the intended applications: the level of reinforcement expected of a bicycle tire, for example, is known to be distinctly lower than that required for a tire capable of traveling at a sustained high speed, for example a motorcycle tire, a passenger-vehicle tire or a tire for a utility vehicle such as a heavy vehicle.

For treads for tires which are liable to travel at high speed, the quantity of silica prepared in accordance with the preparation process described further above and/or having the characteristics described above, is preferably of between 30 and 120 phr, more preferably of between 40 and 100 phr.

II.3 Coupling Agent

It will be recalled here that (inorganic filler/elastomer) "coupling agent" is to be understood to mean, in known manner, an agent capable of establishing a sufficient chemical and/or physical bond between the inorganic filler and the diene elastomer; such a coupling agent, which is at least bifunctional, has, for example, the simplified general formula "Y-T-X", in which:

Y represents a functional group ("Y" function) which is capable of bonding physically and/or chemically with the inorganic filler, such a bond being able to be established, for example, between a silicon atom of the coupling agent and the surface hydroxyl (OH) groups of the inorganic filler (for example, surface silanols in the case of silica);

X represents a functional group ("X" function) which is capable of bonding physically and/or chemically with the diene elastomer, for example by means of a sulfur atom;

T represents a divalent organic group making it possible to link Y and X.

It will be recalled that the coupling agents must not be confused with simple agents for covering the inorganic filler which, in known manner, may comprise the "Y" function which is active with respect to the inorganic filler but are devoid of the "X" function which is active with respect to the diene elastomer.

(Silica/diene elastomer) coupling agents, of variable effectiveness, have been described in a very large number of documents and are well-known to the person skilled in the art. Any known coupling agent likely to ensure, in the diene rubber compositions usable for the manufacture of tire treads, the effective bonding between a reinforcing inorganic filler such as silica and a diene elastomer, in particular organosilanes or polyfunctional polyorganosiloxanes bearing the functions X and Y mentioned above, may be used.

In particular polysulfurised silanes, which are referred to as "symmetrical" or "asymmetrical" depending on their specific structure, are used, such as those described for example in the patents or patent applications FR 2 149 339, FR 2 206 330, U.S. Pat. Nos. 3,842,111, U.S. 3,873,489, U.S. 3,978,103, U.S. 3,997,581, U.S. 4,002,594, U.S. 4,072, 701, U.S. 4,129,585, U.S. 5,580,919, U.S. 5,583,245, U.S. 5,650,457, U.S. 5,663,358, U.S. 5,663,395, U.S. 5,663,396, U.S. 5,674,932, U.S. 5,675,014, U.S. 5,684,171, U.S. 5,684, 172, U.S. 5,696,197, U.S. 5,708,053, U.S. 5,892,085, EP 1 043 357.

Particularly suitable for implementing the invention, without the definition below being limitative, are symmetrical polysulfurised silanes which satisfy the following general formula:

Z—A—S$_n$—A—Z, in which:

n is from 2 to 8;

A is a divalent hydrocarbon radical (preferably $C_1$-$C_{18}$ alkylene groups or $C_6$-$C_{12}$ arylene groups, more particularly $C_1$-$C_{10}$ alkylenes, notably $C_1$-$C_4$ alkylenes, in particular propylene);

Z corresponds to one of the formulae below:

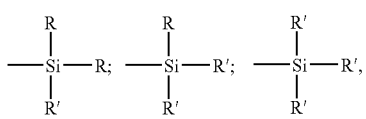

in which:

the radicals R, which may or may not be substituted, and may be identical or different, represent a $C_1$-$C_{18}$ alkyl group, a $C_5$-$C_{18}$ cycloalkyl group or a $C_6$-$C_{18}$ aryl group, (preferably $C_1$-$C_6$ alkyl groups, cyclohexyl or phenyl, in particular $C_1$-$C_4$ alkyl groups, more particularly methyl and/or ethyl).

the radicals R', which may or may not be substituted, and may be identical or different, represent a hydroxyl group, a $C_1$-$C_{18}$ alkoxyl group or a $C_5$-$C_{18}$ cycloalkoxyl group (preferably a group selected from among hydroxyl, $C_1$-$C_8$ alkoxyl and $C_5$-$C_8$ cycloalkoxyl, more preferably still a group selected from among hydroxyl and $C_1$-$C_4$ alkoxyl, in particular methoxyl and ethoxyl).

In the case of a mixture of polysulfurised silanes of the formula (I) above, in particular the conventional mixtures available commercially, it will be understood that the average value of the "n"s is a fractional number, preferably within a range from 2 to 5.

As examples of polysulfurised silanes, mention will be made more particularly of the polysulfides (in particular disulfides, trisulfides or tetrasulfides) of bis-(($C_1$-$C_4$) alkoxyl-($C_1$-$C_4$)alkylsilyl($C_1$-$C_4$)alkyl). Conventionally bis (3-trimethoxysilylpropyl) or bis(3-triethoxysilylpropyl) polysulfides such as bis(3-triethoxysilylpropyl) tetrasulfide, abbreviated to TESPT, or bis-(triethoxysilylpropyl) disulfide, abbreviated to TESPD, are used in diene rubber compositions reinforced with an inorganic filler.

TESPD is sold, for example, by Degussa under the name Si75 (in the form of a mixture of disulfide—75% by weight—and of polysulfides), or alternatively by Witco under the name Silquest A1589. TESPT is sold, for example, by Degussa under the name Si69 (or X50S when it is supported to 50% by weight on carbon black), or alternatively by Osi Specialties under the name Silquest A1289 (in both cases, a commercial mixture of polysulfides having an average value of n which is close to 4).

The Applicants have demonstrated, during their research, that the compromise of tire performances may be further improved if the coupling agent is selected from among the polysulfides of bis-alkoxyalkylsilanes of general formula described further above, and of the formula (I):

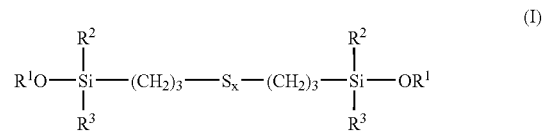

in which:

the symbols $R^1$, which may be identical or different, each represent a monovalent hydrocarbon group selected from among alkyls, whether straight-chain or branched, having from 1 to 4 carbon atoms and alkoxyalkyls, whether straight-chain or branched, having from 2 to 8 carbon atoms;

the symbols $R^2$ and $R^3$, which may be identical or different, each represent a monovalent hydrocarbon group selected from among alkyls, which are straight-chain or branched, having from 1 to 6 carbon atoms and the phenyl radical;

x is an integer or fraction of between 3 and 5.

Thus the coupling agent is advantageously a tetrasulfurised monoalkoxysilane of the formula (I) selected from among those of specific formulae (II), (III) or (IV) hereafter:

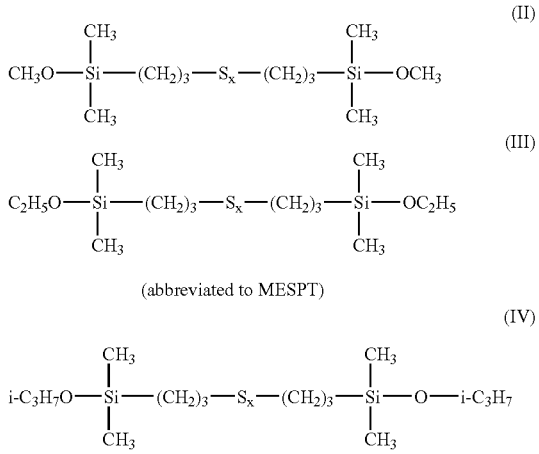

(abbreviated to MESPT)

in which the symbol x has the general definition (average x of between 3 and 5), and in particular the preferred definitions given above (namely average x lying within a range from 3.5 to 4.5, more preferably still within a range from 3.8 to 4.2). More particularly, the coupling agent is monoethoxydimethylsilylpropyl tetrasulfide (abbreviated to MESPT), of formula $[(C_2H_5O)(CH_3)2Si(CH_2)_3S_2]_2$, the monoethoxylated homologue of the aforementioned TESPT.

In this formula III, x preferably lies within a range from 3.5 to 4.5, more preferably still within a range from 3.8 to 4.2.

Such compounds, and their preparation process, are more extensively described in the international application (not published to date) filed under the No. PCT/EP02/03774.

The person skilled in the art will be able to adjust the content of coupling agent in the compositions of the invention, according to the intended application, the nature of the elastomer used, and the quantity of silica, supplemented if applicable by any other inorganic filler used as supplementary reinforcing filler.

The coupling agent is used in a preferred amount representing between 0.5% and 20% by weight relative to the quantity of reinforcing inorganic filler. Amounts less than 15% are more particularly preferred.

So as to make allowance for the differences in specific surface area and density of the reinforcing inorganic fillers which may be used, as well as the molar masses of the coupling agents specifically used, it is preferable to determine the optimum amount of coupling agent, in moles per meter squared of reinforcing inorganic filler, if applicable for each reinforcing inorganic filler used; this optimum amount is calculated from the weight ratio [coupling agent/reinforcing inorganic filler], the BET surface area of the filler and the molar mass of the coupling agent (referred to as M hereafter), according to the following known equation:

(moles/m$^2$ inorganic filler)=[coupling agent/inorganic filler](1/BET)(1/$M$)

Thus, preferably, the quantity of coupling agent used in the compositions according to the invention lies between $10^{-7}$ and $10^{-5}$ moles per m$^2$ of reinforcing inorganic filler. More preferably still, the amount of coupling agent lies between $5 \times 10^{-7}$ and $5 \times 10^{-6}$ moles per m$^2$ of total inorganic filler.

Taking into account the quantities expressed above, generally, the content of coupling agent is preferably between 1 and 20 phr. Below the minimum amount indicated, the effect risks being inadequate, whereas beyond the maximum amount advocated generally no further improvement is observed, while the costs of the composition increase. for these various reasons, this content is more preferably still between 2 and 10 phr.

The Applicants have furthermore demonstrated that it is possible to reduce by the order of 20% the quantity of coupling agent necessary in a composition for a tread reinforced with a silica, prepared in accordance with the preparation process described further above and/or having the characteristics described above, while maintaining a level of tire performances which is substantially identical. The effect of such a reduction in the amount of coupling agent in a composition containing a conventional silica is generally to reduce the tire performances. This appearance therefore constitutes an advantage of the compositions according to the invention as far as the cost of the tires is concerned.

The coupling agent used could be grafted beforehand (via the "X" function) on to the diene elastomer of the composition of the invention, the elastomer thus functionalized or "precoupled" then comprising the free "Y" function for the reinforcing inorganic filler. The coupling agent could also be grafted beforehand (via the "Y" function) on to the reinforcing inorganic filler, the filler thus "precoupled" then being able to be bonded to the diene elastomer by means of the free "X" functions. However, it is preferred to use the coupling agent in the free (i.e. non-grafted) state or grafted on to the reinforcing inorganic filler, in particular for reasons of better processing of the compositions in the uncured state.

Finally, there may possibly be associated with the coupling agent an appropriate "coupling activator", that is to say, a body (single compound or association of compounds) which, when mixed with this coupling agent, increases the effectiveness of the latter (see, for example, aforementioned applications WO00/5300 and WO00/5301).

II.4 Various Additives

Of course, the elastomeric tire compositions according to the invention also comprise all or some of the conventional additives used in diene rubber compositions intended in particular for the manufacture of tire treads, such as, for example, extender oils, plasticizers, protective agents such as anti-ozone waxes, chemical antiozonants, antioxidants, anti-fatigue agents, adhesion promoters, coupling activators, reinforcing resins, methylene acceptors and/or donors, a cross-linking system based on either sulfur, or on sulfur and/or peroxide and/or bismaleimide donors, vulcanization accelerators or vulcanization activators. There may also be associated with the silica used in the invention, if necessary, a conventional poorly reinforcing or non-reinforcing white filler, such as particles of clay, bentonite, talc, chalk, kaolin, which are usable for example in colored tire treads.

The elastomeric compositions may also contain, in addition to the coupling agents previously described, covering agents for inorganic fillers, comprising for example the single Y function, or more generally processing aids liable, in known manner, owing to an improvement in the dispersion of the reinforcing inorganic filler in the rubber matrix and to a reduction in the viscosity of the compositions, to improve their ability to be worked in the uncured state; these agents, used in a preferred amount of between 0.5 and 3 phr, are, for example, alkylalkoxysilanes, in particular alkyltriethoxysilanes, such as 1-octyl-triethoxysilane sold by Degussa-Hüls under the name Dynasylan Octeo or 1-hexadecyl-triethoxysilane sold by Degussa-Hüls under the name Si216, polyols, polyethers, (for example polyethylene glycols), primary, secondary or tertiary amines (for example trialkanolamines), hydroxylated or hydrolysable polyorganosiloxanes, for example α,ω-dihydroxy-polyorganosiloxanes (in particular α,ω-dihydroxy-polydimethylsiloxanes).

II.5 Preparation of the Rubber Compositions and Treads

The elastomeric tire compositions are produced in suitable mixers, using two successive preparation phases well-known to the person skilled in the art: a first phase of thermomechanical working or kneading (sometimes referred to as "non-productive" phase) at high temperature, up to a maximum temperature ($T_{max}$) of between 110° C. and 190° C., preferably between 130° C. and 180° C., followed by a second phase of mechanical working (sometimes referred to as "productive" phase) at lower temperature, typically less than 110° C., for example between 40° C. and 100° C., during which finishing phase the base cross-linking or vulcanization system is incorporated; such phases have been described for example in the aforementioned applications EP 501 227, EP 735 088, WO00/05300 or WO00/05301.

The process for manufacturing the compositions according to the invention is characterized in that at least the silica used in the invention (whether or not associated with another reinforcing inorganic filler or a carbon black) and the coupling agent are incorporated by kneading into the diene elastomer during the first, so-called non-productive, phase, that is to say that at least these different base constituents are introduced into the mixer and are kneaded thermomechanically, in one or more steps, until a maximum temperature of between 110° C. and 190° C., preferably between 130° C. and 180° C., is reached.

By way of example, the first (non-productive) phase is effected in a single thermomechanical step during which in a first phase all the base constituents necessary (diene elastomer, reinforcing inorganic filler and coupling agent), then in a second phase, for example after one to two minutes' kneading, any complementary covering agents or processing agents and other various additives, with the exception of the cross-linking or vulcanization system, are introduced into a suitable mixer, such as a conventional internal mixer; as the apparent density of the silica according to the invention is generally low, it may be advantageous to divide the introduction thereof into two or more parts.

A second (or even several) step(s) of thermomechanical working may be added to this internal mixer, after the mixture has dropped and after intermediate cooling (cooling temperature preferably less than 100° C.), with the aim of making the compositions undergo complementary thermomechanical treatment, in particular in order to improve further the dispersion, in the elastomeric matrix, of the reinforcing inorganic filler and its coupling agent. The total duration of the kneading, in this non-productive phase, is preferably between 2 and 10 minutes.

After cooling of the mixture thus obtained, the cross-linking or vulcanization system is then incorporated at low temperature, generally in an external mixer such as an open mill; the entire mixture is then mixed (productive phase) for several minutes, for example between 5 and 15 minutes.

The cross-linking or vulcanization system proper is preferably based on sulfur and a primary vulcanization accelerator, in particular an accelerator of the sulfenamide type. To this basic vulcanization system there are added, incorporated during the first, non-productive phase and/or during the productive phase, various known secondary accelerators or vulcanization activators such as zinc oxide, stearic acid, guanidine derivatives (in particular diphenylguanidine), etc. The sulfur is used in a preferred amount of between 0.5 and 10 phr, more preferably of between 0.5 and 5.0 phr, for example between 0.5 and 3.0 phr when the invention is applied to a tire tread. The primary vulcanization accelerator is used in a preferred amount of between 0.5 and 10 phr, more preferably of between 0.5 and 5.0 phr in particular when the invention applies to a tire tread.

In summary, the process for preparing a diene rubber composition for tires according to the invention comprises the following steps:

i. there is incorporated in a diene elastomer, during a first stage referred to as "non-productive":

as reinforcing filler, an inorganic filler constituted in its entirety or in part of a silica obtained in accordance with the process described further above and/or having the characteristics such as defined further above.

and a coupling agent providing the bond between the inorganic filler and the diene elastomer;

ii. the entire mixture is kneaded thermomechanically, in one or more stages, until a maximum temperature of between 110° C. and 190° C. is reached;

iii. the whole is cooled to a temperature of less than 100° C.;

iv. there is then incorporated, during a second step referred to as "productive", a cross-linking or vulcanization system;

v. the entire mixture is kneaded until a maximum temperature less than 110° C. is reached.

The final composition thus obtained is then calendared, for example in the form of thin slabs (thickness of 2 to 3 mm) or thin sheets of rubber in order to measure its physical or mechanical properties, in particular for laboratory characterization, or alternatively extruded to form rubber profiled elements used directly for the manufacture of semi-finished products such as treads, crown plies, sidewalls, carcass plies, beads, protectors, inner tubes or airtight internal rubbers for tubeless tires.

The vulcanization or curing of the rubber composition, in particular of the tread produced therewith or of the tire, is carried out in known manner at a temperature preferably of between 130° C. and 200° C., preferably under pressure, for a sufficient time which may vary for example between 5 and 90 min as a function of in particular the curing temperature, the vulcanization system adopted, the vulcanization kinetics of the composition in question and the size of the tire.

The diene rubber compositions for tires previously described based on silica are advantageously used for the manufacture of treads for tires. In this case, they generally constitute the entire tread according to the invention. However, the invention also applies to those cases in which these rubber compositions form only part of a composite-type tread, formed for example of different transversely adjacent strips, or alternatively of two radially superposed layers of different constitutions, the part filled with silica possibly constituting for example the radially outer layer of the tread intended to come into contact with the ground from the start of running of the new tire, or on the contrary its radially inner layer intended to come into contact with the ground at a later date.

It goes without saying that the present invention relates to the rubber compositions, treads and tires previously described, both in the "uncured" state (i.e. before curing) and in the "cured" or vulcanized state (i.e. after vulcanization).

III. EXAMPLES OF EMBODIMENT OF THE INVENTION

III.1 Preparation of Fillers

III.1.1 Example 1

10 liters of purified water is introduced into a 25-liter stainless steel reactor. The solution is brought to 80° C. The entire reaction is carried out at this temperature. With stirring (350 rpm, propeller-type stirring), 80 g/l sulfuric acid is introduced until the pH reaches a value of 4.

There are introduced simultaneously into the reactor over 35 minutes a solution of sodium silicate (of weight ratio $SiO_2/Na_2O$ equal to 3.52) having a concentration of 230 g/l and at a flow rate of 76 g/min and sulfuric acid of a concentration equal to 80 g/l at a flow rate regulated so as to keep the pH of the reaction medium at a value of 4. At the 30th minute of the addition, the stirring rate is brought to 450 rpm.

At the end of the 35 minutes' simultaneous addition, the introduction of acid is stopped as long as the pH has not reached a value equal to 9. The flow of silicate is then also stopped. A maturation of 15 minutes at pH 9 is effected. At the end of the maturation, the stirring rate is brought to 350 rpm.

The pH is then brought to pH 8 by introduction of sulfuric acid. Another simultaneous addition is effected for 40 minutes with a flow rate of sodium silicate of 76 g/min (same sodium silicate as for the first simultaneous addition) and a flow rate of sulfuric acid of a concentration equal to 80 g/l regulated so as to keep the pH of the reaction medium at a value of 8.

On emerging from this simultaneous addition, the reaction medium is brought to a pH of 4 by 80 g/l sulfuric acid. The medium is matured for 10 minutes at pH 4. 250 ml of flocculant FA 10 (polyoxyethylene of a molar mass equal to $5\times10^6$ g) at 1% are introduced at the 3rd minute of the maturation.

The slurry is filtered and washed in a vacuum (dry extract of 16.7%). After dilution (dry extract of 13%), the cake obtained is disintegrated mechanically. The resulting slurry is sprayed by means of a turbine sprayer.

The silica (filler B) obtained has the following characteristics:

BET surface area: 240 $m^2/g$
CTAB surface area: 221 $m^2/g$
$d_w$: 79 nm
XDC Mode: 39 nm
Width Ld (XDC): 1.62
Pore distribution width pdw: 1.42
Width L'd (XDC): 1.27
L/FI: 0.62
$V_{(d5-d50)}/V_{(d5-d100)}$: 0.74
Pore volume $V_{80}$: 1.69 $cm^3/g$
$N_{SiOH/nm^2}$: 3.90
Sears number×1000/BET surface area: 42.9
α: 0.00626 $\mu m^{-1}.mn^{-1}$
$Ø_{50S}$ (after ultrasound disagglomeration): 4.8 µm
$F_{DS}$: 4.6 ml III.1.2 Example 2

700 liters of industrial water is introduced into a 2000-liter reactor. This solution is brought to 80° C. by heating by direct steam injection. With stirring (95 rpm), sulfuric acid, of a concentration equal to 80 g/l, is introduced until the pH reaches a value of 4.

There are introduced simultaneously into the reactor over 35 minutes a solution of sodium silicate (of weight ratio $SiO_2/Na_2O$ equal to 3.52) having a concentration of 230 g/l at a flow rate of 190 l/hour and sulfuric acid, of a concentration of 80 g/l, at a flow rate regulated so as to keep the pH of the reaction medium at a value of 4.

At the end of the 35 minutes' simultaneous addition, the introduction of acid is stopped as long as the pH has not reached a value equal to 8. Another simultaneous addition is then effected for 40 minutes with a flow rate of sodium silicate of 190 l/hour (same sodium silicate as for the first simultaneous addition) and a flow rate of sulfuric acid of a concentration equal to 80 g/l, regulated so as to keep the pH of the reaction medium at a value of 8.

On emerging from this simultaneous addition, the reaction medium is brought to a pH of 5.2 by sulfuric acid of a concentration of 80 g/l. The medium is matured for 5 minutes at pH 5.2.

The slurry is filtered and washed under a filter press (dry extract of the cake 22%). The cake obtained is disintegrated by adding a quantity of sodium aluminate corresponding to a weight ratio $Al/SiO_2$ of 0.3%. The resulting slurry is sprayed by means of a nozzle sprayer.

The characteristics of the silica (filler C) obtained in the form of substantially spherical balls are then as follows:

BET surface area: 222 $m^2/g$
CTAB surface area: 200 $m^2/g$
$d_w$: 68 nm
XDC Mode: 34 nm
Width Ld (XDC): 1.0
Pore distribution width pdw: 1.51
Width L'd (XDC): 0.93
L/FI: 0.70
$V_{(d5-d50)}/V_{(d5-d100)}$: 0.71
Pore volume $V_{80}$: 1.44 $cm^3/g$
$N_{SiOH/nm^2}$: 4.50
Sears number×1000/BET surface area: 31.5
α: 0.00566 $\mu m^{-1}.mn^{-1}$
$Ø_{50S}$ (after ultrasound disagglomeration): 4.8 µm
$F_{DS}$: 5.4 ml
$Ø_{50M}$ (after ultrasound disagglomeration): 5.0 µm
$F_{DM}$: 11.5 ml III.1.3 Example 3

10 liters of a solution of sodium silicate (of a weight ratio $SiO_2/Na_2O$ equal to 3.53) having a concentration of 5 g/l is introduced into a 25-liter stainless steel reactor. The solution is brought to 80° C. With stirring (300 rpm, propeller-type stirring), sulfuric acid, of a concentration equal to 80 g/l, is introduced until the pH reaches a value of 4.2.

There are introduced simultaneously into the reactor over 35 minutes a solution of sodium silicate (of weight ratio $SiO_2/Na_2O$ equal to 3.53) having a concentration of 230 g/l, at a flow rate of 50 g/min and sulfuric acid, of a concentration equal to 80 g/l, at a flow rate regulated so as to keep the pH of the reaction medium at a value of 4.2.

At the end of the 35 minutes' simultaneous addition, the introduction of acid is stopped as long as the pH has not reached a value equal to 9. The flow of silicate is then also stopped. A maturation of 15 minutes at pH 9 is effected, while gradually increasing the temperature (within 15 minutes) from 80 to 90° C., at which value the rest of the reaction is carried out.

The pH is then brought to pH 8 by introduction of sulfuric acid of a concentration of 80 g/l. Another simultaneous addition is effected for 50 minutes with a flow rate of sodium silicate of 50 g/min (same sodium silicate as for the first simultaneous addition) and a flow rate of sulfuric acid, of a concentration equal to 80 g/l, regulated so as to keep the pH of the reaction medium at a value of 8.

On emerging from this simultaneous addition, the reaction medium is brought to a pH of 4 by sulfuric acid of a concentration of 80 g/l. The medium is matured for 10 minutes at pH 4.

The slurry is filtered and washed in a vacuum (dry extract of the cake 16.8%). After dilution (dry extract of 10%), the cake obtained is disintegrated mechanically. The resulting slurry is sprayed by means of a turbine sprayer.

The characteristics of the silica (filler D) obtained are then as follows:
BET surface area: 174 m$^2$/g
CTAB surface area: 170 m$^2$/g
$d_w$: 98 nm
XDC Mode: 41 nm
Width Ld (XDC): 3.1
Pore distribution width pdw: 1.42
Width L'd (XDC): 2.27
L/FI: 0.78
$V_{(d5-d50)}/V_{(d5-d100)}$: 0.78
Pore volume $V_{80}$: 1.38 cm$^3$/g
$N_{SiOH/nm}{}^2$: 4.40
Sears number×1000/BET surface area: 50.6
α: 0.00883 μm$^{-1}$.mn$^{-1}$
Ø$_{50S}$ (after ultrasound disagglomeration): 4.3 μm
$F_{DS}$: 3.7 ml III.2 Fillers Used Some characteristics of the fillers used in the following examples are set forth in the table below.

The filler A is a conventional highly dispersible silica of high specific surface area (BET approximately 160 m$^2$/g), reference inorganic filler for the reinforcement of the treads of "Green Tires" (silica "Zeosil 1165 MP" from Rhodia).

Fillers B, C and D are the highly dispersible silicas obtained in Examples 1, 2 and 3. These different silicas advantageously satisfy all the following characteristics:
(a) a BET surface area within a range from 130-300 m$^2$/g, in particular from 150-280 m$^2$/g;
(b) a CTAB surface area within a range from 120-280 m$^2$/g, in particular of 140-260 m$^2$/g;
(c) a particle size $d_w$ within a range from 20 to 300 nm, in particular of 40 to 150 nm; a particle size distribution such that
(d) dw≧(16,500/CTAB)−30;
(e) a porosity which meets the criterion L/FI≧−0.0025 CTAB+0.85;
(f) an amount of silanols per unit of surface area, $N_{SiOH/nm}{}^2$, $N_{SiOH/nm}{}^2$≦−0.027 CTAB+10.5.
(g) a disagglomeration rate α at least equal to 0.0035 μm$^{-1}$.mn$^{-1}$, or even at least 0.0037 μm$^{-1}$.mn$^{-1}$;

The table which follows is a summary of the fillers used in the tests

Fillers used in the tests:

| Silica filler: | A | B | C | D |
| --- | --- | --- | --- | --- |
| BET surface area (m$^2$/g) | 160 | 240 | 222 | 174 |
| CTAB surface area (m$^2$/g) | 155 | 221 | 200 | 170 |
| $d_w$ (nm) | 59 | 79 | 68 | 98 |
| L/FI | 0.39 | 0.62 | 0.70 | 0.78 |
| $N_{SiOH/nm}{}^2$ | 8.10 | 3.90 | 4.50 | 4.40 |
| α (μm−1 · mn-1) | 0.0049 | 0.00626 | 0.00566 | 0.00883 |

III.3 Preparation of the Bis-monoethoxydimethylsilylpropyl Tetrasulfide.

The bis-monoethoxydimethylsilylpropyl tetrasulfide is used as coupling agent in the tests 2. It is prepared in accordance with the method described in the international patent application (not published to date) filed under the No. PCT/EP02/03774.

91.9 g of sodium ethanolate (1.352 mole, or the equivalent of 2 moles per 1 mole of H$_2$S) in solution at 21 mass % in ethanol (438 g) and 250 ml of toluene are introduced in a current of argon into the bottom of a 3-liter double-casing glass reactor which is fitted with a condenser, a mechanical stirring means (Rushton turbine), a thermocouple, a gas feed pipe (argon or H2S) and an intake for the peristaltic pump.

The whole is stirred (200-300 rpm). A weight of 65 g of sulfur (2.031 moles, or the equivalent of 3 moles per one mole of H$_2$S) is then added. After purging the circuits with argon, the H$_2$S (23 g, or 0.676 mole) is introduced by bubbling by means of a dip tube, namely for 45 to 60 minutes. The solution changes from an orange coloration with yellow-orange particles to a dark brown coloration without particles.

Under a current of argon, the mixture is heated to 60° C. for 1 hour so as to complete the conversion into anhydrous Na$_2$S$_4$. The reaction medium changes from a dark brown to a red-brown color with brown particles. The reaction medium is then cooled using a refrigeration means (at 10-15° C.) to reach a temperature close to 20° C.

A weight of 244 g γ-chloropropylethoxydimethylsilane (1.352 moles, or the equivalent of 2 moles per mole of H$_2$S) is added by means of a peristaltic pump (10 ml/min) over 30 minutes. The reaction medium is then heated to 75±2° C. for 4 hours. During the test, the NaCl precipitates. At the end of the 4 hours' heating, the medium is cooled to ambient temperature (20-25° C.). It adopts an orange color with yellow particles.

After decanting of the reaction medium, it is filtered over cellulose card under nitrogen pressure in a stainless steel filter. The cake is washed with 2 times 100 ml of toluene. The red-brown filtrate is evaporated in a vacuum (maximum pressure=3-4×10$^2$ Pa—maximum temperature=70° C.).

A weight of 280 g of bis-monoethoxydimethylsilylpropyl tetrasulfide (0.669 mole) is then obtained in the form of a yellow-orange oil. This compound is used as coupling agent in the following tests 2.

III.4 Preparation of the Compositions

For the following tests, the procedure is as follows: the diene elastomer (or the mixture of diene elastomers, if applicable), then the reinforcing filler, the coupling agent, then, after one to two minutes' kneading, the various other ingredients, with the exception of the sulfur and the sulfenamide primary accelerator, are introduced into an internal mixer filled to 70%, the initial tank temperature of which is approximately 60° C. Thermomechanical working (non-productive phase) is then performed in one or two steps (total duration of kneading equal to about 7 minutes), until a maximum "dropping" temperature of about 160-165° C. is reached.

The mixture thus obtained is recovered, it is cooled and then the sulfur and sulfenamide accelerator are added on an external mixer (homo-finisher) at 30° C., by mixing everything (productive phase) for 3 to 4 minutes.

The compositions are then either calendared in the form of plates (thickness of 2 to 3 mm) in order to measure their physical or mechanical properties, or extruded directly in the form of tire treads.

In the tests which follow, the HD silica advantageously constitutes the entire reinforcing inorganic filler, associated with a small amount of carbon (less than 10 phr).

III.5 Tests

III.5.1 Tests 1:

The aim of these tests is to demonstrate the improved performances of an elastomeric composition based on HD silica according to the invention, compared with a control composition using a conventional HD silica for a tread for a "Green Tire".

For this, two diene rubber compositions (SBR/BR blend) intended for the manufacture of treads for passenger-car tires are compared:

composition C-1 (control) contains the silica A;
composition C-2 (invention) contains the silica B.

The appended Tables 1 and 2 give successively the formulation of the different compositions (Table 1—amount of the different products expressed in phr), and their properties before and after curing at 150° C. for 40 minutes (Table 2).

FIG. 1 shows the curves of modulus (in MPa) as a function of the elongation (in %); these curves are marked C1 and C2, and correspond to compositions C-1 and C-2 respectively.

A study of the results of Table 2 demonstrates, for the composition according to the invention compared with the conventional control composition:

- a viscosity in the uncured state (97 MU) which is admittedly increased compared with C-1 (93 MU), but which is explained by the increase in the specific surface area of the silica and therefore of the possible contact surface, which is in any case astonishingly very much less than what might have been expected for such an increase in the specific surface area. This translates into easy processing of B for a specific surface area of this nature;
- an amount of filler/elastomer coupling obtained with the filler B greater than that achieved with the conventional filler A (illustrated by the Bound Rubber value BR);
- rheometric properties close compared with C-1 as illustrated by the values T5, $t_i$, $t_{90}$, $t_{90}$-$t_i$ and finally K;
- reinforcement properties after curing which are at least equivalent to those of the conventional control composition C-1: Shore hardness equivalent but moduli at high deformation (MA100, MA300) slightly higher and an identical ratio MA300/MA100, both indicators of a good quality of the reinforcement provided by the HD silica according to the invention.
- finally and above all, even more unexpectedly for the person skilled in the art, significantly improved hysteresis properties (reduction of ΔG* and tan(δ)max).

The appended FIG. 1 confirms these results with, for elongations of 100% and more, a modulus which is greater in the case of composition C-2 (curve C2 above the curve C1 beyond 100%), which is proof of a strong interaction between the diene elastomer and the HD silica according to the invention.

Such results must now face real running tests on the treads, as set forth in the test which follows.

Running Test:

The above compositions C-1 and C-2 are used in this test as treads for passenger-car tires having a radial carcass, of dimension 175/70 R14 (speed index T), which are conventionally manufactured and identical in all points except for the rubber composition constituting the tread: composition C-1 for the "Green Tires" (P-1) and composition C-2 for the tires according to the invention (P-2).

Tires were first tested on a machine to determine their rolling resistance. Then the wear resistance of tires was tested on a vehicle.

All the running results are summarized in Table 3.

It will be noted first of all that the rolling resistance of the tire is improved by 4%, which is significant and synonymous of a reduction in the fuel consumption for a vehicle fitted with tires according to the invention.

The tires are then subjected to on-road travel on a passenger car of the marque Citroën Xsara, in order to determine the wear resistance. In known manner, the wear resistance of the tread, during the travel of the tire, is directly correlated to the level of reinforcement provided by the reinforcing filler and its associated coupling agent. In other words, the measurement of the wear resistance is an excellent indicator, if not the best since it is evaluated on the final manufactured product, of the overall performance of the inorganic filler used.

Furthermore a very significant improvement in the wear resistance of 14% compared with the result obtained with the conventional control (silica A) is noted. For a person skilled in the art, such an increase in the wear resistance is considered to be particularly important and surprising.

The technical properties, which are significantly improved for some, of the compositions and treads according to the invention compared with those of the conventional compositions and treads of the prior art, constitute a compromise of properties which is of particular interest and particularly unexpected to the person skilled in the art.

III.5.2 Tests 2:

The aim of these tests is to demonstrate the still further improved performances of an elastomeric composition based on HD silica according to the invention comprising bis-monoethoxydimethylsilylpropyl tetrasulfide (MESPT) as coupling agent, compared with an elastomeric composition based on the same HD silica according to the invention, and to a control composition using a conventional HD silica for a tread for a "Green Tire", these two compositions comprising TESPT as coupling agent.

For this, three diene rubber compositions (SBR/BR blend) intended for the manufacture of treads for passenger-car tires are compared:

composition C-3 (control) contains the silica A and TESPT;
composition C-4 (invention) contains the silica C and TESPT;
composition C-5 (invention) contains the silica C and MESPT.

The appended Tables 4 and 5 give successively the formulation of the different compositions (Table 4—amount of the different products expressed in phr), their properties before and after curing at 150° C. for 40 minutes (Table 5). The amounts of coupling agent have an equal number of moles in compositions C-4 and C-5.

Studying the results of Table 5 demonstrates:

- a substantially identical viscosity in the uncured state for the two compositions according to the invention C-4 and C-5 and astonishingly close to that [of] the conventional composition C-3, whereas the specific surface area of the silica according to the invention is far greater than that of the conventional silica and therefore the possible contact surface as well. This translates into easy processing of the silica C for a specific surface area of this nature;
- an amount of filler/elastomer coupling obtained with the filler C greater than that achieved with the conventional filler A (illustrated par the Bound Rubber value BR);
- a significant improvement in the curing kinetics by associating MESPT as coupling agent with the silica C according to the invention, compared with the curing kinetics of a composition containing an association of TESPT with a conventional silica or the same silica according to the invention;
- reinforcement properties after curing which are at least equivalent to those of the conventional control composition C-1: Shore hardness equivalent but moduli at high deformation (MA100, MA300) slightly higher and a ratio MA300/MA100 which is close, both indicators of a good quality of the reinforcement provided by the HD silica according to the invention;
- finally and above all, even more unexpectedly for the person skilled in the art, significantly improved hysteresis properties (reduction of ΔG* and tan(δ)max) for the composition associating the silica according to the invention with the MESPT, not only relative to the conventional control composition, but also relative to a composition according to the invention associating TESPT with the silica.

Such results must now face real running tests on the treads, as set forth in the test which follows.

Running Test:

The above compositions C-3, C-4 and C-5 are used in this test as treads for radial-carcass passenger-car tires, of dimension 175/70 R14 (speed index T), which are conventionally manufactured and identical in all points except for the rubber composition constituting the tread: composition C-3 for the control "Green Tires" (P-3) and compositions C-4 and C-5 for the tires according to the invention (P-4 and P-5).

Tires were first tested on a machine to determine their rolling resistance. Then the wear resistance of tires was tested on a vehicle.

All the running results are summarized in Table 6.

It will be noted first of all that the rolling resistance of the tire based on compositions according to the invention is significantly improved compared with the conventional control, which is synonymous of a reduction in the fuel consumption for a vehicle fitted with tires according to the invention. An additional improvement of 3% is also noted, which is significant if MESPT as coupling agent is associated with the silica according to the invention rather than the conventional TESPT. This is synonymous with an even more marked reduction in the fuel consumption for a vehicle fitted with tires according to the invention for which the rubber composition constituting the tread comprises MESPT as coupling agent. Such improvements are significant and unexpected for a person skilled in the art.

The tires are then subjected to on-road travel on a passenger car of the marque Peugeot 306, in order to determine the wear resistance. In known manner, the wear resistance of the tread, during the travel of the tire, is directly correlated to the level of reinforcement provided by the reinforcing filler and its associated coupling agent. In other words, the measurement of the wear resistance is an excellent indicator, if not the best since it is evaluated on the final manufactured product, of the overall performance of the inorganic filler used.

Furthermore a very significant improvement in the wear resistance of 9 to 10% for the tires according to the invention compared with the result obtained with the conventional control (silica A) is noted. For a person skilled in the art, such an increase in the wear resistance is considered to be particularly important and surprising.

The improvement in the compromise in tire performances of treads according to the invention associating a specific coupling agent, MESPT, with the silica compared with that of treads according to the invention associating conventional TESPT as coupling agent with the silica, is significant and surprising.

The technical properties, which are significantly improved for some, of the compositions and treads according to the invention compared with those of the conventional compositions and treads of the prior art, constitute a compromise of properties which is of particular interest and particularly unexpected to the person skilled in the art.

III.5.3 Tests 3:

The aim of these tests is to demonstrate the improved performances of an elastomeric composition based on HD silica according to the invention, compared with a control composition using a conventional HD silica for a tread for a "Green Tire", both silicas having specific surface areas which are close to each other.

For this, two diene rubber compositions (SBR/BR blend) intended for the manufacture of treads for passenger-car tires are compared:

composition C-6 (control) contains the silica A;
composition C-7 (invention) contains the silica D.

The appended Tables 7 and 8 give successively the formulation of the different compositions (Table 7—amount of the different products expressed in phr), their properties before and after curing at 150° C. for 40 minutes (Table 8).

A study of the results of Table 8 demonstrates, for the composition according to the invention compared with the conventional control composition:

a viscosity in the uncured state and an amount of filler/elastomer coupling which are substantially identical to those of the conventional control composition.

rheometric properties which, as illustrated by the values t90-ti and finally K, are close to, or even better than, those of the conventional control composition, with improved kinetics for the same specific surface area;

reinforcement properties which are slightly superior to those of the conventional control composition, as shown by the values of the ratio MA100 and MA300.

finally and above all, even more unexpectedly for the person skilled in the art, significantly improved hysteresis properties (reduction of ΔG* and tan(δ)max), which makes it possible to predict an improvement in the compromise of the rolling resistance/wear resistance performances.

The properties both in the uncured and in the cured state for the composition according to the invention compared with the conventional composition of the prior art constitute a very good compromise which is of particular interest to a person skilled in the art.

TABLE 1

| Composition No. | C-1 | C-2 |
|---|---|---|
| SBR (1) | 82.6 | 82.6 |
| BR (2) | 30 | 30 |
| Silica A | 80 | |
| Silica B | | 80 |
| carbon black (3) | 6 | 6 |
| aromatic oil (4) | 20 | 20 |
| TESPT (5) | 6.4 | 8.8 |
| DPG (6) | 1.5 | 2 |
| ZnO | 2.5 | 2.5 |
| Stearic acid | 2 | 2 |
| Paraffin (7) | 1.5 | 1.5 |
| Antioxidant (8) | 2.0 | 2.0 |
| Sulfur | 1 | 1 |
| Accelerator (9) | 2 | 2 |

(1) SSBR with 59.5% of 1,2 polybutadiene units; 26.5% of styrene; Tg = −29° C. 75 phr dry SBR extended with 18% by weight of aromatic oil (namely a total of SSBR + oil equal to 82.6 phr);
(2) BR with 4.3% of 1–2; 2.7% of trans; 93% of cis 1–4 (Tg = −106° C.);
(3) carbon black N234;
(4) aromatic oil in free form ("Enerflex 65" from BP);
(5) TESPT ("Si69" from Degussa);
(6) diphenylguanidine ("Vulcacit D" from Bayer);
(7) mixture of macro- and microcrystalline anti-ozone waxes;
(8) N-1,3-dimethylbutyl-N-phenyl-para-phenylenediamine ("Santoflex 6-PPD" from Flexsys);
(9) N-cyclohexyl-2-benzothiazyl sulfenamide (from Flexsys: "Santocure" CBS).

TABLE 2

| Composition No. | C-1 | C-2 |
|---|---|---|
| Properties before curing: | | |
| Mooney | 93 | 97 |
| BR (%) | 49 | 63 |
| Ti (min) | 9.0 | 9.5 |
| $t_{90}$ (min) | 22.4 | 25.3 |
| $t_{90}-t_i$ (min) | 13.4 | 15.8 |
| K (min$^{-1}$) | 0.17 | 0.15 |
| Properties after curing: | | |
| Shore hardness | 66.5 | 67 |
| MA10 (MPa) | 5.70 | 5.63 |
| MA100 (MPa) | 1.73 | 1.89 |
| MA300 (MPa) | 2.09 | 2.29 |
| MA300/MA100 | 1.21 | 1.21 |
| □G* | 4.85 | 3.65 |
| Tan(□)max (40° C.) | 0.300 | 0.266 |

TABLE 3

| Properties (in relative units) | P-1 | P-2 |
|---|---|---|
| Rolling resistance: | 100 | 104 |
| Wear resistance: | 100 | 114 |

(a value greater than 100 indicates an improved performance)

TABLE 4

| Composition No. | C-3 | C-4 | C-5 |
|---|---|---|---|
| SBR (1) | 82.5 | 82.5 | 82.5 |
| BR (2) | 30 | 30 | 30 |
| Silica A (3) | 80 | — | — |
| Silica C (4) | — | 80 | 80 |
| carbon black (5) | 6 | 6 | 6 |
| aromatic oil (6) | 20.0 | 20.0 | 20.0 |
| TESPT (7) | 6.4 | 8.7 | — |
| MESPT (8) | — | — | 6.8 |
| DPG (9) | 1.5 | 2 | 2 |
| ZnO | 2.5 | 2.5 | 2.5 |
| Stearic acid | 2 | 2 | 2 |
| Paraffin (10) | 1.5 | 1.5 | 1.5 |
| Antioxidant (11) | 2.0 | 2.0 | 2.0 |
| Sulfur | 1.1 | 1.1 | 1.1 |
| Accelerator (12) | 2.0 | 2.0 | 2.0 |

(1) SSBR with 59.5% of 1,2 polybutadiene units; 26.5% of styrene; Tg = −29° C. 75 phr dry SBR extended with 18% by weight of aromatic oil (namely a total of SSBR + oil equal to 88.5 phr);
(2) BR with 4.3% of 1–2; 2.7% of trans; 93% of cis 1–4 (Tg = −106° C.);
(3) Control silica A: type "HDS" - "Zeosil" 1165 MP from Rhodia in the form of microbeads (BET and CTAB: approximately 150–160 m2/g)
(4) Silica C according to the invention;
(5) Carbon black N234;
(6) aromatic oil in free form ("Enerflex 65" from BP);
(7) TESPT ("Si69" from Degussa);
(8) MESPT (synthesized in accordance with III.4)
(9) diphenylguanidine ("Vulcacit D" from Bayer);
(10) mixture of macro- and microcrystalline anti-ozone waxes;
(11) N-1,3-dimethylbutyl-N-phenyl-para-phenylenediamine ("Santoflex 6-PPD" from Flexsys);
(12) N-cyclohexyl-2-benzothiazyl sulfenamide (from Flexsys: "Santocure" CBS).

TABLE 5

| Composition No. | C-3 | C-4 | C-5 |
|---|---|---|---|
| Properties before curing: | | | |
| Mooney | 101 | 99 | 99.5 |
| T5 (min) | 16 | 14 | 16 |
| BR (%) | 50 | 60.5 | 59.2 |
| $T_i$ (min) | 7.9 | 6.91 | 8.22 |
| $T_{90}$ (min) | 20.9 | 22.7 | 18.92 |
| $t_{90}-t_i$ (min) | 13 | 15.79 | 10.7 |
| K (min$^{-1}$) | 0.180 | 0.150 | 0.220 |
| Properties after curing: | | | |
| Shore hardness | 65.4 | 66.7 | 66.5 |
| MA10 (MPa) | 5.25 | 5.75 | 5.8 |
| MA100 (MPa) | 1.74 | 2.08 | 2.05 |
| MA300 (MPa) | 2.15 | 2.59 | 2.65 |
| MA300/MA100 | 1.24 | 1.25 | 1.29 |
| □G* | 4.02 | 3.61 | 3.14 |
| Tan(□)max (40° C.) | 0.274 | 0.249 | 0.226 |

TABLE 6

| Properties (in relative units) | P-3 | P-4 | P-5 |
|---|---|---|---|
| Rolling resistance: | 100 | 103 | 106 |
| Wear resistance: | 100 | 110 | 109 |

(a value greater than 100 indicates an improved performance)

TABLE 7

| Composition No. | C-6 | C-7 |
|---|---|---|
| SBR (1) | 103.12 | 103.12 |
| BR (2) | 25 | 25 |
| Silica A (3) | 80 | — |
| Silica D (4) | — | 80 |
| Carbon black (5) | 1 | 1 |
| Aromatic oil (6) | 5.13 | 5.13 |
| TESPT (7) | 6.4 | 7.00 |
| DPG (8) | 1.5 | 1.64 |
| ZnO | 2.5 | 2.5 |
| Stearic acid | 2.0 | 2.0 |
| Antioxidant (9) | 1.9 | 1.9 |
| Sulfur | 1.1 | 1.1 |
| Accelerator (10) | 2.0 | 2.0 |

(1) SSBR with 58% of 1–2 polybutadiene units; 25% of styrene; Tg = −25° C.; SBR extended with 37.5 phr of aromatic oil (namely 75 phr of SSBR + 28.12 phr of oil)
(2) BR with 4.3% of 1–2; 2.7% of trans; 93% of cis 1–4 (Tg = −106° C.)
(3) Control silica A: type "HDS" - "Zeosil" 1165 MP from Rhodia in the form of microbeads (BET and CTAB: approximately 150–160 m$^2$/g)
(4) Silica D according to the invention;
(5) Carbon black N234;
(6) aromatic oil in free form ("Enerflex 65" from BP);
(7) TESPT ("Si69" from Degussa);
(8) diphenylguanidine ("Vulcacit D" from Bayer);
(9) N-1,3-dimethylbutyl-N-phenyl-para-phenylenediamine ("Santoflex 6-PPD" from Flexsys);
(10) N-cyclohexyl-2-benzothiazyl sulfenamide (Flexsys: "Santocure" CBS).

TABLE 8

| Compositions No. | C-6 | C-7 |
|---|---|---|
| Properties before curing | | |
| Mooney | 104 | 103 |
| BR (%) | 54.2 | 56.9 |
| $t_i$ (min) | 12.8 | 15.1 |
| $t_{90}$ (min) | 31.5 | 31.2 |

TABLE 8-continued

| Compositions No. | C-6 | C-7 |
|---|---|---|
| $t_{90}-t_i$ | 18.7 | 16.1 |
| K (min$^{-1}$) | 0.123 | 0.143 |
| Properties after curing | | |
| Shore hardness | 69.2 | 66.6 |
| MA10 (MPa) | 6.4 | 5.28 |
| MA100 (MPa) | 1.8 | 1.95 |
| MA300 (MPa) | 2.05 | 2.25 |
| MA300/MA100 | 1.14 | 1.15 |
| □G* | 5.02 | 2.63 |
| Tan(□)max (23° C.) | 0.330 | 0.262 |

What is claimed is:

1. A tire comprising a rubber composition comprising at least a diene elastomer, a reinforcing inorganic filler, and a coupling agent providing the bond between the reinforcing filler and the elastomer, wherein said inorganic filler comprises at least one silica having all the following characteristics:
    a) a BET specific surface area of between 45 and 400 m$^2$/g;
    b) a CTAB specific surface area of between 40 and 380 m$^2$/g;
    c) an average particle size (by mass), $d_w$, of 20 to 300 nm;
    d) a particle size distribution such that $d_w \geq (16,500/CTAB)-30$;

e) a porosity which meets the criterion $L/FI \geq -0.0025\ CTAB+0.85$;

f) an amount of silanols per unit of surface area, $N_{SiOH/nm^2}$, $N_{SiOH/nm^2} \leq -0.027\ CTAB+10.5$.

2. The tire according to claim 1, said silica having a BET specific surface area of between 80 and 300 m$^2$/g and a CTAB specific surface area of between 70 and 280 m$^2$/g.

3. The tire according to claim 2, said silica having a BET specific surface area of between 130 and 300 m$^2$/g and a CTAB specific surface area of between 120 and 280 m$^2$/g.

4. The tire according to claim 1, said silica having BET and CTAB specific surface areas, $S_{BET}$ and $S_{CTAB}$, which satisfy the relationship $(S_{BET}-S_{CTAB}) \geq 5$ m$^2$/g.

5. The tire according to claim 4, said silica having BET and CTAB specific surface areas which satisfy the relationship $(S_{BET}-S_{CTAB}) < 50$ m$^2$/g.

6. The tire according to claim 1, said silica having a disagglomeration rate, α, measured by means of an ultrasound disagglomeration test in pulse mode (1 s ON, 1 s OFF), at 100% power of a 600 W ultrasound probe, of at least 0.0035 μm$^{-1}$·mn$^{-1}$.

7. The tire according to claim 1, wherein said composition further comprises carbon black in an amount of between 2 and 20 phr.

8. The tire according to claim 7, wherein the amount of carbon black is in a range of from 5 to 15 phr.

9. The tire according to claim 1, wherein said coupling agent is selected from the group consisting of the polysulphurized alkoxysilanes of the formula (I):

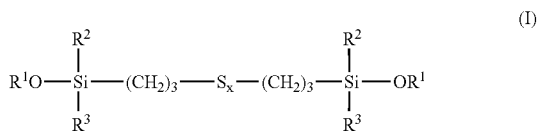

wherein:
    R$^1$, which may be identical or different, each represents a monovalent hydrocarbon group selected from the group consisting of straight-chain and branched alkyls having from 1 to 4 carbon atoms, and straight-chain and branched alkoxyalkyls having from 2 to 8 carbon atoms;
    R$^2$ and R$^3$, which may be identical or different, each represents a monovalent hydrocarbon group selected from the group consisting of straight-chain and branched alkyls having from 1 to 6 carbon atoms, and phenyl; and
    x is an integer or fraction of between 3 and 5.

10. The tire according to claim 9, wherein said coupling agent is selected from the group consisting of the polysulphurized alkoxysilanes of the formulae (II), (III) and (IV):

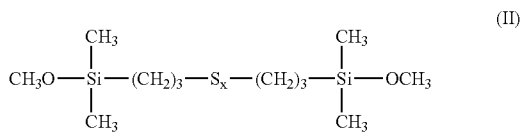

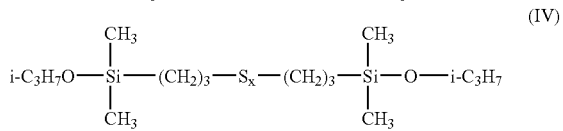

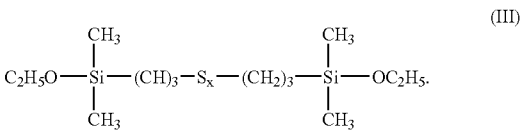

11. The tire according to claim 10, wherein said coupling agent is monoethoxydimethylsilylpropyl tetrasulphide of formula [(C$_2$H$_5$O)(CH$_3$)$_2$Si(CH$_2$)$_3$S$_2$]$_2$.

12. The tire according to claim 1, wherein said rubber composition is present in the tread of the tire.

* * * * *